US012720439B2

(12) United States Patent
Kutz et al.

(10) Patent No.: US 12,720,439 B2
(45) Date of Patent: Aug. 25, 2026

(54) ADAPTIVE POWER AMPLIFIER BACK-OFF LEVEL

(71) Applicant: QUALCOMM Incorporated, San Diego, CA (US)

(72) Inventors: Gideon Shlomo Kutz, Ramat Hasharon (IL); Assaf Touboul, Netanya (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/358,178

(22) Filed: Jul. 25, 2023

(65) Prior Publication Data

US 2025/0039798 A1 Jan. 30, 2025

(51) Int. Cl.

| | |
|---|---|
| ***H04W 52/14*** | (2009.01) |
| ***H04W 52/24*** | (2009.01) |
| ***H04W 72/1268*** | (2023.01) |

(52) U.S. Cl.

CPC ......... *H04W 52/146* (2013.01); *H04W 52/24* (2013.01); *H04W 72/1268* (2013.01)

(58) Field of Classification Search

CPC ..... H04L 5/0053; H04L 5/001; H04L 5/0051; H04L 27/0006; H04L 5/0055; H04L 5/0094; H04L 5/0007; H04L 5/0044; H04L 5/0048; H04L 5/0064; H04L 1/0003; H04L 1/1822; H04L 1/0009; H04L 5/0091; H04L 27/2601; H04L 5/0098; H04L 1/001; H04L 1/1887; H04L 1/1896; H04L 27/2602; H04L 1/0004; H04L 1/0023; H04L 1/0075; H04L 1/18; H04L 1/1874; H04W 74/0808; H04W 52/146; H04W 72/0446; H04W 72/23; H04W 52/367; H04W 16/14; H04W 74/006; H04W 72/12; H04W 52/346; H04W 72/0453; H04W 76/27; H04W 52/143; H04W 52/34; H04W 74/0891; H04W 52/365; H04W 88/10; H04W 52/281; H04W 74/0816; H04W 16/28; H04W 52/08; H04W 52/42; H04W 72/1268; H04W 24/10; H04W 52/14

See application file for complete search history.

(56) References Cited

U.S. PATENT DOCUMENTS 12,089,243 B2 * 9/2024 Cui ....................... H04L 5/0048
2011/0081935 A1 * 4/2011 Yeon ................... H04W 52/346 455/522

(Continued)

*Primary Examiner* — Golam Sorowar
(74) *Attorney, Agent, or Firm* — Holland & Hart LLP

(57) ABSTRACT

Methods, systems, and devices for wireless communications are described. A user equipment (UE) may transmit a capability message indicating support for adaptive power amplifier back-off for uplink transmissions. The UE may receive, based at least in part on the capability message, an identifier for an adaptive power amplifier back-off scheme to be applied to an uplink transmission. The UE may perform the uplink transmission according to the adaptive power amplifier back-off scheme, wherein the adaptive power amplifier back-off scheme comprises a change to at least one of an error vector magnitude level for a power amplifier of the UE or an output power of the power amplifier of the UE, wherein the change triggers the power amplifier to operate in a non-linear region such that the uplink transmission includes a non-linear component.

27 Claims, 16 Drawing Sheets

(56) References Cited

U.S. PATENT DOCUMENTS

| | | | | |
|---|---|---|---|---|
| 2012/0314746 | A1* | 12/2012 | Lorenz | H03G 3/3042 375/224 |
| 2020/0154364 | A1* | 5/2020 | Rahman | H04B 7/0404 |
| 2020/0280926 | A1* | 9/2020 | Piipponen | H04W 52/16 |
| 2021/0344535 | A1* | 11/2021 | Sridharan | H04L 27/26362 |
| 2024/0243838 | A1* | 7/2024 | Farhadi | H04B 1/0475 |
| 2024/0405836 | A1* | 12/2024 | Ghanbarinejad | H04B 7/0695 |

* cited by examiner

ADAPTIVE POWER AMPLIFIER BACK-OFF LEVEL

FIELD OF TECHNOLOGY

The following relates to wireless communications, including an adaptive power amplifier back-off level.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support an adaptive power amplifier (PA) back-off level. For example, the described techniques provide for dynamic (e.g., adaptive) PA back-off levels. For example, a user equipment (UE) may transmit or otherwise provide a capability message that carries or conveys an indication of support for adaptive PA back-off during uplink transmissions (e.g., transmissions where the UE is the transmitting device). The UE may receive or otherwise determine an identifier for an adaptive PA back-off scheme and then perform an uplink transmission according to the adaptive PA back-off scheme. The adaptive PA back-off scheme may include the UE changing the error vector magnitude (EVM) level and/or an output power level of the PA. This change may result in the PA being triggered to operate in a non-linear region such that the uplink transmission includes a non-linear component. Upon receiving the uplink transmission, the network entity may perform or otherwise apply digital post distortion (DPoD) techniques to remove or reduce the non-linear component(s) from the uplink transmission. Accordingly, the UE may be dynamically signaled with a PA back-off level to be applied to the uplink transmission (e.g., rather than the back-off level being fixed or linked to another parameter) so as to allow DPoD transmissions.

A method for wireless communications by a UE is described. The method may include transmitting a capability message indicating support for adaptive PA backoff for uplink transmissions, receiving, based on the capability message, an identifier for an adaptive PA backoff scheme to be applied to an uplink transmission, and performing the uplink transmission according to the adaptive PA backoff scheme, where the adaptive PA backoff scheme includes a change to at least one of an EVM level for a PA of the UE or an output power of the PA of the UE, where the change triggers the PA to operate in a non-linear region such that the uplink transmission includes a non-linear component.

A UE for wireless communications is described. The UE may include one or more memories storing processor executable code, and one or more processors coupled with the one or more memories. The one or more processors may individually or collectively operable to execute the code to cause the UE to transmit a capability message indicating support for adaptive PA backoff for uplink transmissions, receive, based on the capability message, an identifier for an adaptive PA backoff scheme to be applied to an uplink transmission, and perform the uplink transmission according to the adaptive PA backoff scheme, where the adaptive PA backoff scheme includes a change to at least one of an EVM level for a PA of the UE or an output power of the PA of the UE, where the change triggers the PA to operate in a non-linear region such that the uplink transmission includes a non-linear component.

Another UE for wireless communications is described. The UE may include means for transmitting a capability message indicating support for adaptive PA backoff for uplink transmissions, means for receiving, based on the capability message, an identifier for an adaptive PA backoff scheme to be applied to an uplink transmission, and means for performing the uplink transmission according to the adaptive PA backoff scheme, where the adaptive PA backoff scheme includes a change to at least one of an EVM level for a PA of the UE or an output power of the PA of the UE, where the change triggers the PA to operate in a non-linear region such that the uplink transmission includes a non-linear component.

A non-transitory computer-readable medium storing code for wireless communications is described. The code may include instructions executable by a processor to transmit a capability message indicating support for adaptive PA backoff for uplink transmissions, receive, based on the capability message, an identifier for an adaptive PA backoff scheme to be applied to an uplink transmission, and perform the uplink transmission according to the adaptive PA backoff scheme, where the adaptive PA backoff scheme includes a change to at least one of an EVM level for a PA of the UE or an output power of the PA of the UE, where the change triggers the PA to operate in a non-linear region such that the uplink transmission includes a non-linear component.

Some examples of the method, user equipment (UEs), and non-transitory computer-readable medium described herein may further include operations, features, means, or instructions for indicating a set of supported EVM levels, a set of supported output power levels, or both, in the capability message, where the support for adaptive PA backoff may be based on the set of supported EVM levels, the set of supported output power levels, or both.

Some examples of the method, user equipment (UEs), and non-transitory computer-readable medium described herein may further include operations, features, means, or instructions for receiving a control signal identifying a set of adaptive PA backoff schemes available for use by the UE and selecting the adaptive PA backoff scheme from the set of adaptive PA backoff schemes based on the identifier.

In some examples of the method, user equipment (UEs), and non-transitory computer-readable medium described herein, the set of adaptive PA backoff schemes include a set of supported EVM levels, a set of supported output power levels, or both.

Some examples of the method, user equipment (UEs), and non-transitory computer-readable medium described herein may further include operations, features, means, or instructions for receiving a grant scheduling the uplink transmission, the grant including an uplink transmission frequency resource allocation and determining the identifier based on the uplink transmission frequency resource allocation.

Some examples of the method, user equipment (UEs), and non-transitory computer-readable medium described herein may further include operations, features, means, or instructions for receiving a grant scheduling the uplink transmission, where the identifier may be received in the grant.

Some examples of the method, user equipment (UEs), and non-transitory computer-readable medium described herein may further include operations, features, means, or instructions for receiving, based on the identifier, an updated adaptive PA backoff level, where the adaptive PA backoff scheme may be based on the updated adaptive PA backoff level.

In some examples of the method, user equipment (UEs), and non-transitory computer-readable medium described herein, the updated adaptive PA backoff level triggers an updated EVM level, an updated output power, or both.

In some examples of the method, user equipment (UEs), and non-transitory computer-readable medium described herein, the adaptive PA backoff scheme may be based on at least one of a cell load for a network entity the UE may be communicating in, a UE-state associated with the UE, a UE-type of the UE, or any combination thereof.

In some examples of the method, user equipment (UEs), and non-transitory computer-readable medium described herein, to operate the PA in the non-linear region includes use of a power supply voltage applied to the PA based on the change to the EVM level.

In some examples of the method, user equipment (UEs), and non-transitory computer-readable medium described herein, to operate the PA in the non-linear region includes increasing an output power level of the PA based on the change to the output power.

A method for wireless communications by a network entity is described. The method may include receiving, from a UE, a capability message indicating support for adaptive PA backoff for uplink transmissions, transmitting, based on the capability message, an identifier for an adaptive PA backoff scheme, receiving an uplink transmission from the UE, where the uplink transmission includes a transmitter-introduced non-linear component that is due, at least in part, to the adaptive PA backoff scheme, and performing a DPoD operation on the uplink transmission to reduce the transmitter-introduced non-linear component of the uplink transmission.

A network entity for wireless communications is described. The network entity may include one or more memories storing processor executable code, and one or more processors coupled with the one or more memories. The one or more processors may individually or collectively operable to execute the code to cause the network entity to receive, from a UE, a capability message indicating support for adaptive PA backoff for uplink transmissions, transmit, based on the capability message, an identifier for an adaptive PA backoff scheme, receive an uplink transmission from the UE, where the uplink transmission includes a transmitter-introduced non-linear component that is due, at least in part, to the adaptive PA backoff scheme, and perform a DPoD operation on the uplink transmission to reduce the transmitter-introduced non-linear component of the uplink transmission.

Another network entity for wireless communications is described. The network entity may include means for receiving, from a UE, a capability message indicating support for adaptive PA backoff for uplink transmissions, means for transmitting, based on the capability message, an identifier for an adaptive PA backoff scheme, means for receiving an uplink transmission from the UE, where the uplink transmission includes a transmitter-introduced non-linear component that is due, at least in part, to the adaptive PA backoff scheme, and means for performing a DPoD operation on the uplink transmission to reduce the transmitter-introduced non-linear component of the uplink transmission.

A non-transitory computer-readable medium storing code for wireless communications is described. The code may include instructions executable by a processor to receive, from a UE, a capability message indicating support for adaptive PA backoff for uplink transmissions, transmit, based on the capability message, an identifier for an adaptive PA backoff scheme, receive an uplink transmission from the UE, where the uplink transmission includes a transmitter-introduced non-linear component that is due, at least in part, to the adaptive PA backoff scheme, and perform a DPoD operation on the uplink transmission to reduce the transmitter-introduced non-linear component of the uplink transmission.

Some examples of the method, network entities, and non-transitory computer-readable medium described herein may further include operations, features, means, or instructions for selecting the adaptive PA backoff scheme based on a set of supported EVM levels, a set of supported output power levels, or both, indicated in the capability message.

Some examples of the method, network entities, and non-transitory computer-readable medium described herein may further include operations, features, means, or instructions for transmitting a control signal identifying a set of adaptive PA backoff schemes available for use by the UE, where the adaptive PA backoff scheme may be selected from the set of adaptive PA backoff schemes based on the identifier.

In some examples of the method, network entities, and non-transitory computer-readable medium described herein, the set of adaptive PA backoff schemes include a set of supported EVM levels, a set of supported output power levels, or both.

Some examples of the method, network entities, and non-transitory computer-readable medium described herein may further include operations, features, means, or instructions for transmitting a grant scheduling the uplink transmission, the grant including an uplink transmission frequency resource allocation, where the identifier may be based on the uplink transmission frequency resource allocation.

Some examples of the method, network entities, and non-transitory computer-readable medium described herein may further include operations, features, means, or instructions for transmitting a grant scheduling the uplink transmission, where the identifier may be indicated in the grant.

Some examples of the method, network entities, and non-transitory computer-readable medium described herein may further include operations, features, means, or instructions for transmitting, based on the identifier, an updated adaptive PA backoff level, where the adaptive PA backoff scheme may be based on the updated adaptive PA backoff level.

In some examples of the method, network entities, and non-transitory computer-readable medium described herein, the updated adaptive PA backoff level triggers an updated EVM level, an updated output power, or both.

In some examples of the method, network entities, and non-transitory computer-readable medium described herein, the adaptive PA backoff scheme may be based on at least one of a cell load of the network entity, a UE-state associated with the UE, a UE-type of the UE, or any combination thereof.

DETAILED DESCRIPTION

Figure 1:
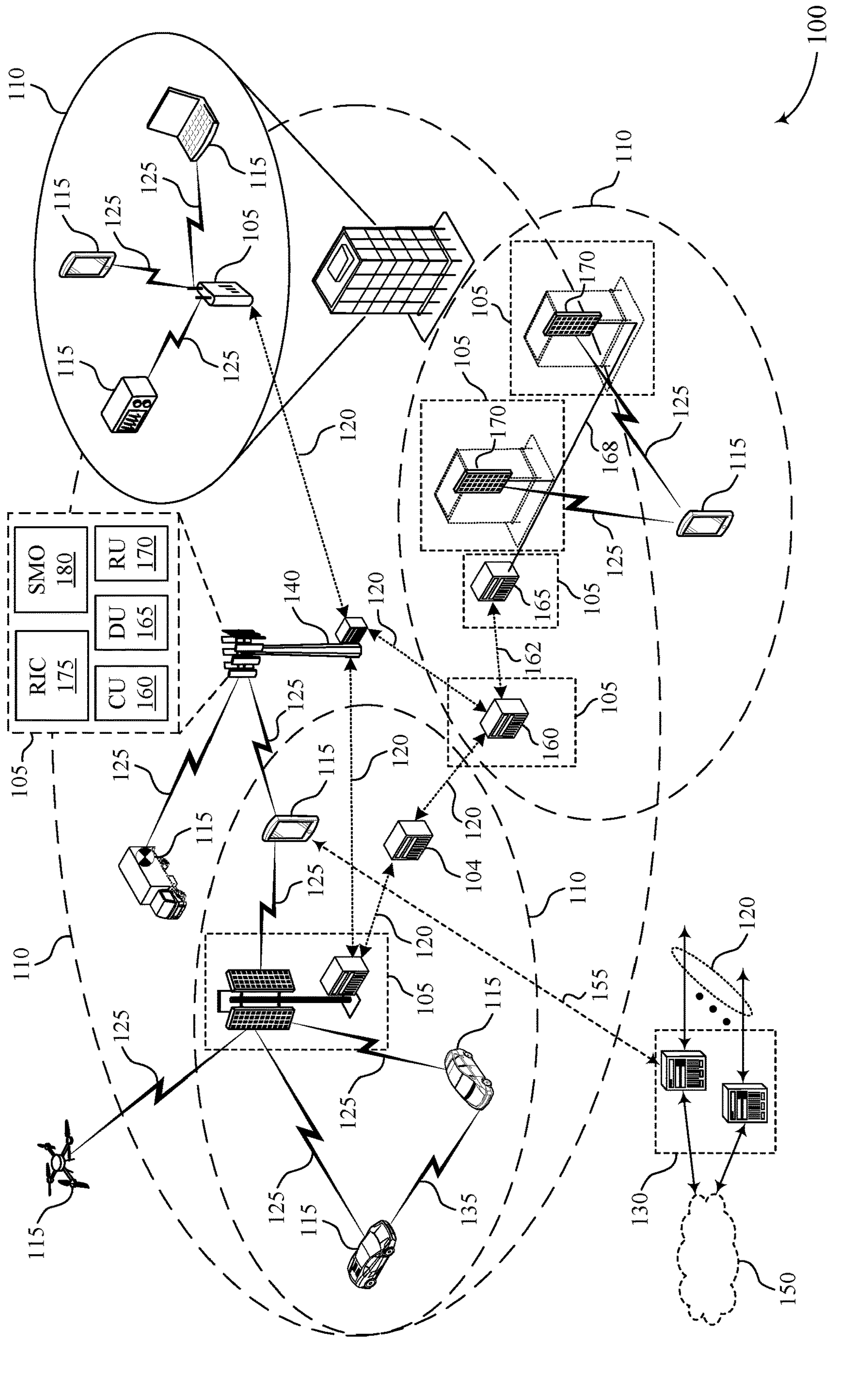
FIG. 1 shows an example of a wireless communications system that supports adaptive power amplifier (PA) back-off in accordance with one or more aspects of the present disclosure.

A wireless network may apply digital post distortion (DPoD) techniques at a transmitting device to increase the transmit power by operating its power amplifier (PA) close to its compression point. This results in non-linearities being introduced into the transmission, which the receiving device iteratively reconstructs and subtracts from the signal using the DPoD techniques. Alternatively, the transmitting device may lower its PA supply voltage to push the PA into the non-linear region, such as to improve its power efficiency. This approach also utilizes DPoD techniques at the receiver to reconstruct the signal.

Legacy wireless systems are often designed to avoid the introduction of non-linearities into a transmission. To that end, legacy wireless systems may include static signaling that informs a user equipment (UE) to apply a power back-off for transmissions. However, if DPoD is to be used, meaning that some level of non-linearity in transmissions is to be allowed (and then removed at a receiver through DPoD techniques), then statically-set power back-off values may be less helpful. While a large power back-off might be necessary to avoid having a transmitter's PA operate in a non-linear region, a smaller power back-off might be desirable in order to allow for some non-linearities (when a receiver is enabled to use DPoD techniques to remove the non-linearity). However, networks do not currently provide a mechanism that supports dynamic power back-off levels and signaling. That is, conventional networks may not support such dynamic power back-off levels because the back-off levels are generally fixed in relation to other parameters (e.g., based on the modulation of the signal).

Accordingly, the described techniques relate to improved methods, systems, devices, and apparatuses that support an adaptive PA back-off level. For example, the described techniques provide for dynamic (e.g., adaptive) PA back-off levels. For example, a UE may transmit or otherwise provide a capability message that carries or conveys an indication of support for adaptive PA back-off during uplink transmissions (e.g., transmissions where the UE is the transmitting device). The UE may receive or otherwise determine an identifier for an adaptive PA back-off scheme and then perform an uplink transmission according to the adaptive PA back-off scheme. The adaptive PA back-off scheme may include the UE changing the error vector magnitude (EVM) level and/or an output power level of the PA. This change may result in the PA being triggered to operate in a non-linear region such that the uplink transmission includes a non-linear component. The network entity may perform or otherwise apply DPoD techniques to remove or reduce the non-linear component(s) of the uplink transmission. Accordingly, the UE may be dynamically signaled with a PA back-off level to be applied to the uplink transmission (e.g., rather than the back-off level being fixed or linked to another parameter).

Aspects of the disclosure are initially described in the context of wireless communications systems. Aspects of the disclosure are further illustrated by and described with reference to apparatus diagrams, system diagrams, and flowcharts that relate to adaptive power amplifier back-off.

FIG. 1 shows an example of a wireless communications system 100 that supports adaptive power amplifier back-off in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support adaptive power amplifier back-off level as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may transmit a capability message indicating support for adaptive PA back-off for uplink transmissions. The UE 115 may receive, based at least in part on the capability message, an identifier for an adaptive PA back-off scheme to be applied to an uplink transmission. The UE 115 may perform the uplink transmission according to the adaptive PA back-off scheme, wherein the adaptive PA back-off scheme comprises a change to at least one of an EVM level for a PA of the UE 115 or an output power of the power amplifier of the UE 115, wherein the change triggers the PA to operate in a non-linear region such that the uplink transmission includes a non-linear component.

A network entity 105 may receive, from a UE 115, a capability message indicating support for adaptive PA back-off for uplink transmissions. The network entity 105 may transmit, based at least in part on the capability message, an identifier for an adaptive PA back-off scheme. The network entity 105 may receive an uplink transmission from the UE 115, wherein the uplink transmission includes a transmitter-introduced non-linear component that is due, at least in part, to the adaptive PA back-off scheme. The network entity 105 may perform a DPoD operation on the uplink transmission to reduce the transmitter-introduced non-linear component of the uplink transmission.

Figure 2:
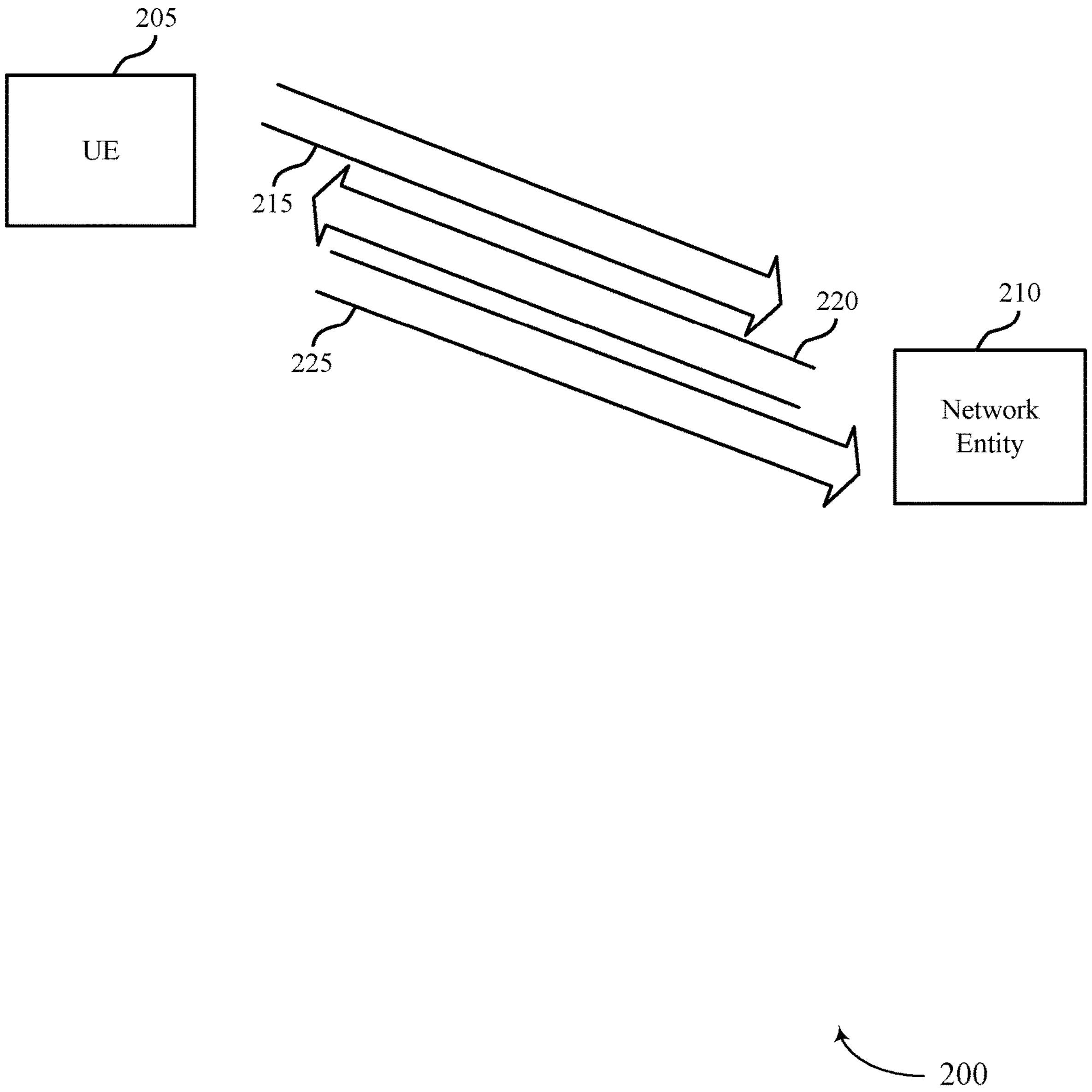
FIG. 2 shows an example of a wireless communications system that supports adaptive PA back-off in accordance with one or more aspects of the present disclosure.

FIG. 2 shows an example of a wireless communications system 200 that supports adaptive PA back-off in accordance with one or more aspects of the present disclosure. Wireless communications system 200 may implement aspects of wireless communications system 100. Wireless communications system 200 may include a UE 205 and a network entity 210, which may be examples of the corresponding devices described herein. Wireless communications system 200 illustrates a non-limiting example of dynamically (e.g., adaptively) identifying, selecting, or otherwise using a particular PA back-off scheme for a transmission by a transmitting device. Although the techniques described herein include the UE 205 being the transmitting device, it is to be understood that the network entity 210 may also utilize the described techniques when performing a transmission to the UE 205.

DPoD techniques enable the transmitting side (e.g., the transmitting device) to perform a transmission where its PA is operating at or near its compression point. That is, the PA of the transmitter is generally a non-linear device in that the output power (e.g., the transmit power level) may not necessarily track the input power (e.g., power supply voltage applied to the PA) in some circumstances. The compression point of the PA is generally the point at which, for a given power level (e.g., input power level and/or output power of the PA), the gain response of the PA becomes non-linear (e.g., the output power is no longer simply a fixed fraction of the input power, as determined by PA gain). Operating at or near the compression point of the PA (e.g., in the non-linear region of the PA) introduces non-linear components to the output of the PA. The compression point may be on the high side (e.g., at or near the maximum output power of the PA) or on the low side (e.g., at or near the minimum input power that the PA needs to produce an output).

In terms of a wireless transmission from the PA, this results in the signal having both linear and non-linear component(s), where the degree or number of non-linear components depend on where (e.g., how close) the PA is operated to its compression point. Examples of such non-linear component(s) include the signal being clipped, interfering signals at or near the target frequency and/or power, phase distortion, among others. Aspects of such non-linear component(s) may be modeled by a linear combination of a set of Volterra kernels (e.g., where the output of a non-linear system depends on the input to the system at all other times).

Some aspects of this linear/non-linear feature of the PA may be based on the back-off that the transmitter uses or otherwise applies to the PA. Each PA is rated for or otherwise supports a maximum transmit power output (e.g., X dBm or watts). Each PA is rated for or otherwise supports a minimum input power level (e.g., Y dBm, volts, or watts). However, operating the PA at its maximum transmit power level and/or with its minimal input power level would push the PA into its compression point, at least to some degree, which induces the non-linear component(s) into the signal.

To avoid or mitigate the non-linear components associated with operating the PA at or near its compression point, the transmitter may apply a back-off to the PA to control or otherwise determine the power level that the PA is operating at. The back-off may be an input back-off where input power (e.g., power supply voltage) is changed (e.g., reduced) to a level that achieves a particular output power (e.g., relative to the input power that produces the maximum output power).

One measure to use for an input back-off scheme may include the EVM, which broadly defines the quality of the transmission (e.g., which includes the PA induced interference). The EVM captures the quality of the signal from the entire transmission chain (e.g., phase noise, gain imbalance, among others). Changing the input power of the PA at or near its compression point varies the amount and/or degree of non-linear component(s) induced into the signal by the transmitter, which results in changing the EVM for the PA. That is, when the backoff of the PA is reduced, the PA non-linear components become the dominant factor in the EVM. Thus, EVM is one non-limiting example of how the back-off scheme applied to the PA may change the nature of the transmitted signal, such as the quality of the signal is reduced based on the non-linear component(s). Another example of a measure to use may include an adjacent channel leakage ratio (ACLR), which generally defines the amount of interference caused to adjacent channels (e.g., in the frequency domain) by the transmitter-induced non-linear components.

Additionally, or alternatively, the back-off may be an output back-off where the output power (e.g., the transmit power level) is set to a particular output power level (e.g., relative to the maximum output power level). For example, the maximum output transmit power level (e.g., output power) of the PA is known, but the actually used transmit power level is changed (e.g., reduced) to be a level relative to the maximum output power. Setting the output power of the PA within a threshold range of its maximum output power would be an example of operating the PA at or near its compression point, which would increase the transmitter-induced non-linear component(s) (e.g., interference or noise component(s)).

One measure to use for an output back-off scheme may include the MPR, which broadly defines the amount of reduction of the output power of the PA in order to meet a certain goal (e.g., to achieve a specific transmit power level). Changing the output power of the PA (e.g., increasing) to be at or near its compression point varies the amount and/or degree of non-linear component(s) induced into the signal by the transmitter, which results in changing the MPR for the PA. Thus, MPR is another non-limiting example of how the back-off scheme applied to the PA may change the nature of the transmitted signal, such as the quality of the signal is reduced based on the introduced non-linear component(s).

Traditionally, the non-linear component(s) of the signal would be considered noise or interference that would interfere with the receiver's ability to successfully receive and decode the transmission. However, DPoD techniques enable the receiver to reconstruct and remove the transmitter-induced non-linear component(s) from the signal. This mitigates the non-linear component interference, which improves the receiver's ability to successfully receive and decode the transmission.

However, the maximum allowed back-off level is specified and/or otherwise fixed. For example, the back-off level and associated EVM are set or otherwise determined to specifically eliminate or minimize non-linear components to achieve a given signal-to-noise ratio (SNR). In particular, the back-off scheme to be applied to the PA of the UE 205 is traditionally set or otherwise fixed, and therefore not adaptive to different scenarios. For example, the PA backoff may be specified per-modulation, per-waveform, or others, where the PA backoff is fixed or otherwise unchangeable for such parameter(s). Such traditional networks do not provide a mechanism or permit changing the back-off scheme applied to the PA of the UE 205, in this example, such that the PA operates in its non-linear region. This may limit utilization of DPoD techniques (e.g., since the EVM/MPR are set such that the PA distortions are minimal) by the network entity 210, in this example, to improve efficiency of the UE 205.

For example, at 215 the UE 205 may transmit or otherwise provide (and the network entity 210 may receive or otherwise obtain) a capability message that carries or otherwise conveys an indication of and/or information identifying support for adaptive PA back-off for uplink transmission. The capability message may be a UE capability message, an assistance information message, an uplink control information message, or other messaging types. This may enable the UE 205 to signal its support for dynamic PA back-off, such as by the UE 205 dynamically controlling or otherwise using its EVM or MPR. MPR may also broadly refer to the output power of the PA of the UE 205.

In some examples, the capability message may carry or otherwise convey an indication of the range of supported EVM and/or MPR values of the UE 205. For example, the capability message may carry or convey an indication and/or identifying information for a set of supported EVM levels and/or a set of supported output power levels of the UE.

At 220 the network entity 210 may transmit or otherwise provide (and the UE 205 may receive or otherwise obtain) an identifier for an adaptive PA back-off scheme to be applied to an uplink transmission. That is, the UE 205 may identify or otherwise determine, at least to some degree, which adaptive PA back-off scheme is to be applied to the uplink transmission based on the identifier received at 220.

In some examples, the identifier received at 220 may include the network entity 210 transmitting a control signal that indicates or otherwise identifies a set of adaptive PA back-off schemes available for use by the UE 205. For example, the control signal may carry or otherwise convey an indication of a set of supported EVM levels and/or a set of supported output power levels (e.g., MPR levels). In this example the UE 205 may select (e.g., autonomously) the identifier of the adaptive PA back-off scheme to apply to the uplink transmission from the set of adaptive PA back-off schemes indicated by the network entity 210. For example, it may be up to UE implementation as to whether or not to increase its output power or to decrease its PA power supply voltage (e.g., whether or not to operate in the non-linear region near its compression point). This may enable, by the UE 205, autonomous and dynamic control of the back-off applied to the PA in order to operate the PA in the non-linear region. In some examples, the UE 205 may transmit or otherwise provide (and the network entity 210 may receive or otherwise obtain) an indication of the identifier of the adaptive PA back-off scheme selected by the UE 205 in the capability message.

In another example, the identifier received at 220 may be carried or otherwise signaled in the grant that schedules the uplink transmission. For example, the network entity 210, based on the capability message, may identify, select, or otherwise determine which adaptive PA back-off scheme is to be applied by the UE 205 to the PA of the UE 205 and signal the identifier of that adaptive PA back-off scheme (e.g., the identifier is carried or conveyed in the grant). The network entity 210 may select the adaptive PA back-off scheme based on the set of supported EVM levels and/or MPR values.

In some examples, the identifier may indicate or otherwise be associated with updating the adaptive PA back-off scheme being applied by the UE 205 to the PA for the uplink transmission. For example, the network entity 210 may transmit or otherwise provide (and the UE 205 may receive or otherwise obtain) an indication of and/or information associated with the updated adaptive PA back-off scheme. The UE 205 may use the updated adaptive PA back-off scheme as the adaptive PA back-off scheme for subsequent uplink transmission(s). For example, the UE 205 may change or otherwise update the EVM level and/or the output power according to the updated adaptive PA back-off scheme.

Updating the adaptive PA back-off scheme may be signaled using different techniques. One example may include the network entity 210 signaling the absolute EVM level and/or MPR value to be applied by the UE 205. For example, the network entity 210 may signal a specific EVM and/or MPR to the UE 205 as part of signaling the updated adaptive PA back-off scheme. Another example may include the network entity 210 signaling a differential EVM level and/or MPR value to be applied by the UE 205. That is, the UE 205 may be transmitting from currently specified EVM level and the network entity 210 may instruct the UE 205 to reduce the back-off (e.g., increase PA output power) by x dB relative to the nominal working point (e.g., relative to the currently specified EVM level). This may support dynamic and online calibration of the EVM level without having to explicitly calibrate these parameters at factory calibration.

Another example may include the network entity 210 signaling a relative EVM level and/or MPR value to be applied by the UE 205. For example, the network entity 210 may signal information related to other parameter(s) associated with the uplink transmission, where signaling those parameter(s) carries information identifying the updated adaptive PA back-off scheme.

At 225, the UE 205 may transmit, perform, or otherwise provide (and the network entity 210 may receive or otherwise obtain) the uplink transmission according to the adaptive PA back-off scheme. That is, the UE 205 may change the EVM level and/or output power (e.g., MPR) of the PA to trigger the PA to operate in the non-linear region. This may result in the uplink transmission including non-linear component(s) that are induced by the UE 205 (e.g., the transmitter, in this example). The network entity 210 (e.g., the receiving device, in this example) may apply the DPoD techniques on the received uplink transmission to eliminate, reduce, or otherwise mitigate the non-linear components introduced by the transmitter.

Accordingly, aspects of the techniques described herein provide mechanisms where the PA back-off is changed or otherwise set to a value that triggers the PA of the UE 205 to operate in the non-linear region during a specific, or a set of, uplink transmission(s). This may improve the power efficiency of the transmitter as well as improve reliability of the uplink transmission.

In some aspects, the adaptive PA back-off scheme applied to the PA for the uplink transmission may be based on various factors. That is, the UE 205 and/or network entity 210 may apply such factors when selecting which PA back-off scheme is to be applied.

One non-limiting example of a factor may be allocation specific. That is, the frequency resource allocated for the uplink transmission (e.g., as carried in the grant scheduling the uplink transmission) may be in the middle of the available frequency spectrum, which may result in the non-linear component(s) spilling over into the adjacent channels (e.g., to other UEs). The other UEs may also support DPoD techniques to reduce the non-linear components. When the frequency resources allocated for the uplink transmission (e.g., as carried in the grant) are in at or near the edge of the available frequency spectrum, this may result in the non-linear component(s) spilling over into other cells and/or frequency bands. This spillover into adjacent cells and/or frequency bands may not be allowed, in some situations. The amount of PA back-off (and associated amount of non-linearity) may be based on the user allocation (e.g., the uplink transmission frequency resource allocation). Thus, the adaptive PA back-off scheme to be applied for the uplink transmission may be identified or otherwise determined based on the uplink transmission frequency resource allocation.

Another non-limiting example of a factor may be the cell load for the network entity 210 that the UE 205 is communicating with. That is, the PA back-off scheme may be based on the cell load. In a low traffic scenario, the network entity 210 may have more computational resources available to support more complex DPoD techniques. Conversely, in a high traffic scenario the network entity 210 may not have such computational resources available. Therefore, in this high traffic scenario the network entity 210 may instruct the UE 205 to use an adaptive PA back-off scheme that triggers the PA to operate in more of the linear region (e.g., to eliminate or minimize non-linear components). Additionally, or alternatively, the UE 205 may select the adaptive PA back-off scheme based on the cell load.

Another non-limiting example of a factor may be a state of the UE (e.g., a UE-state). For example, when the temperature of the UE rises above a threshold amount, the non-linearity of the PA can increase a sufficient amount that DPoD techniques are able to reduce the non-linear components. Accordingly, the UE 205 and/or the network entity 210 may select an adaptive PA back-off scheme that minimizes operating the PA in the non-linear region. Other UE-states may include, but are not limited to, the communication load, the power supply level, and other states of the UE that may impact PA operations.

Another non-limiting example of a factor may be the type of UE that the UE 205 is (e.g., the UE-type). Different UEs have different PAs, with different PA operating differently when triggered to operate in the non-linear region. The UE-type may be considered by the UE 205 and/or the network entity 210 when selecting or otherwise identifying the adaptive PA back-off scheme to be applied for the uplink transmission.

Accordingly, the identifier for the adaptive PA back-off scheme to be applied for the uplink transmission may be signaled in a variety of manners. One example may include DCI signaling, such as the DCI scheduling the uplink transmission. DCI signaling may be applied, for example, when the PA back-off is based on the frequency resource allocation, the cell load, and/or the UE-state. Additionally, or alternatively, RRC signaling may be used to identify or otherwise determine the identifier of the adaptive PA back-off scheme. RRC signaling may be applied, for example, when the PA back-off is based on the UE-type. To minimize the DCI size, a set of possible levels (e.g., EVM levels and/or MPR values, which may correspond to adaptive PA back-off schemes) may be signaled via RRC signaling and/or using medium access control-control element (MAC-CE) signaling. The DCI, in this example, may signal an index or other identifying information for the adaptive PA back-off scheme to be selected from the set.

Additionally, or alternatively, the PA back-off level may be RRC and/or MAC-CE signaled to the UE 205. The DCI, in this example, may then signal a differential level, such as whether to increase or decrease the PA back-off level by x dB from the currently PA back-off level. In some examples, the step size (e.g., x dB) may be RRC signaled (e.g., based on the UE type and/or otherwise fixed or known).

Additionally, or alternatively, there could be a specified allocation dependent rule that the PA back-off level is implicitly derived from the current allocation (whether the frequency resource allocation it is centered or at the edges of the frequency band). Several back-off levels (e.g., EVM levels and/or MPR values) may be signaled by RRC or MAC-CE message and the selection of the PA back-off level out of this list may be implicitly signaled by a (pre)defined rule that links the frequency resource allocation to the adaptive PA back-off scheme.

Figure 3:
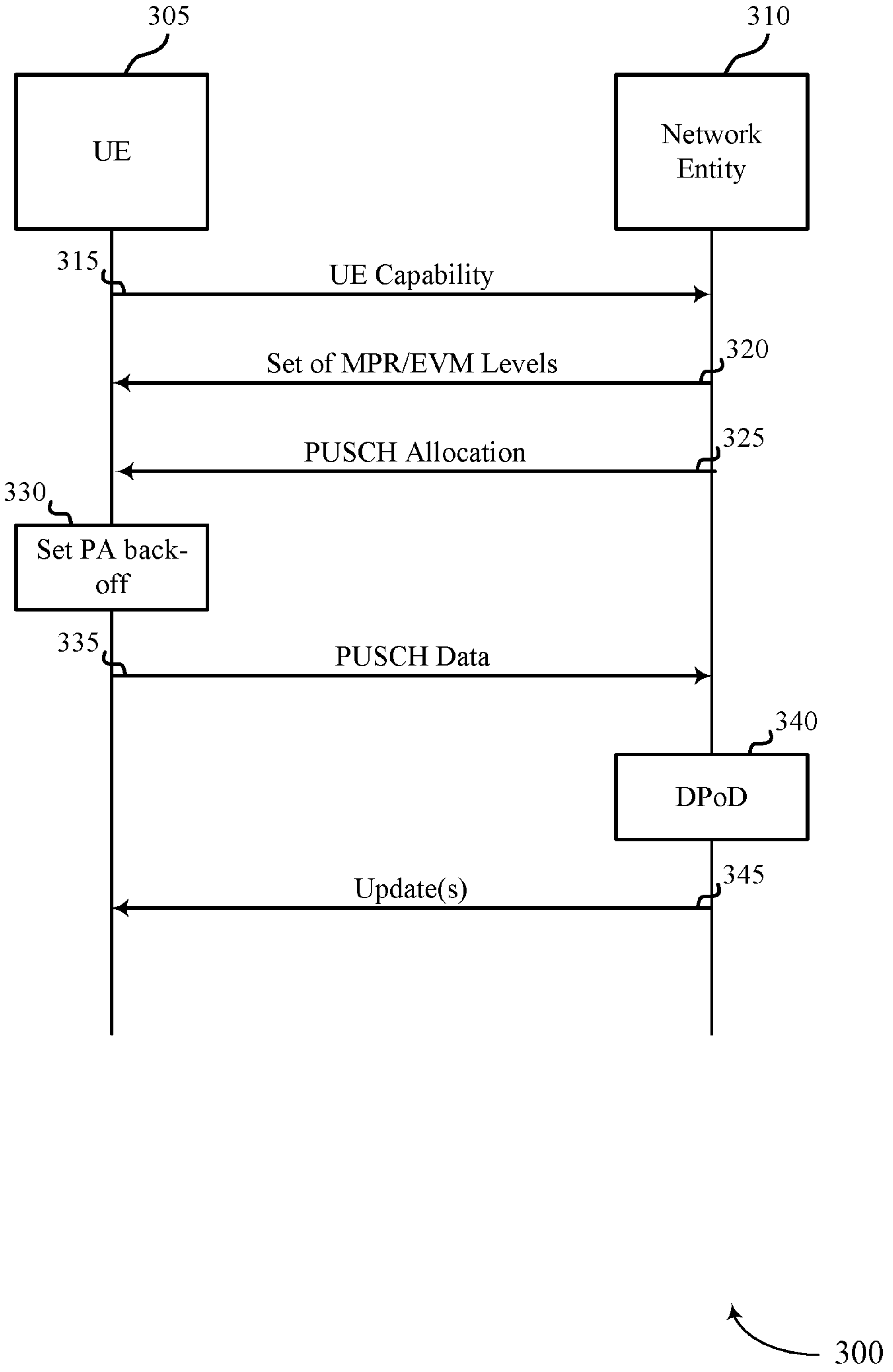
FIG. 3 shows an example of a process that supports adaptive PA back-off in accordance with one or more aspects of the present disclosure.

FIG. 3 shows an example of a process 300 that supports adaptive PA back-off in accordance with one or more aspects of the present disclosure. Process 300 may implement aspects of wireless communications system 100 and/or wireless communications system 200. Aspects of process 300 may be implemented at or implemented by a UE 305 and/or a network entity 310, which may be examples of the corresponding devices described herein.

At 315, the UE 305 may transmit or otherwise provide (and the network entity 310 may receive or otherwise obtain) a capability message indicating support for adaptive PA back-off for uplink transmissions. The capability message may indicate a set of adaptive PA back-off schemes supported by the UE 305. The capability message may indicate a set of EVM levels supported by the UE 305. The capability message may indicate a set of MPR values supported by the UE 305. For example, the MPR values may be specified per-modulation (e.g., constellation) and/or per-waveform (e.g., OFDM, DFT-OFDM, or other waveforms).

At 320, the network entity 310 may transmit otherwise provide (and the UE 305 may receive or otherwise obtain) an indication of a set of adaptive PA back-off schemes available for use by the UE 305. The indication may be provided in a control signal (e.g., RRC signaling and/or MAC-CE signaling). The control signal may indicate a set of EVM levels available for use by the UE 305. The control signal may indicate a set of MPR values available for use by the UE 305. The control signal may be based, at least to some degree, on the capability message indicating support for adaptive PA back-off schemes by the UE 305.

At 325, the network entity 310 may transmit or otherwise provide (and the UE 305 may receive or otherwise obtain) a grant scheduling the uplink transmission from the UE 305. For example, the grant may provide an allocation of resources (e.g., PUSCH allocation) to be used for the uplink transmission. The PUSCH resource allocation may identify the frequency domain, time domain, spatial domain, and/or code domain resources allocated for the uplink transmission.

At 330, the UE 305 may set its PA back-off level according to an adaptive PA back-off scheme. The adaptive PA back-off scheme to be used for the uplink transmission may be identified based on the control signal received at 320 and/or based on the grant received at 325. For example, the UE 305 may identify the adaptive PA back-off scheme to be used autonomously based on the set of EVM levels and/or MPR values signaled at 320. The UE 305 may identify the adaptive PA back-off scheme to be used based on the grant received at 325. For example, the grant may carry or convey information identifying the adaptive PA back-off scheme to be used. As another example, the grant may allocate frequency resources for the uplink transmission, where the adaptive PA back-off scheme is identified based on the frequency allocation.

Accordingly, at 335 the UE 305 may transmit or otherwise provide (and the network entity 310 may receive or otherwise obtain) the uplink transmission according to the adaptive PA back-off scheme. For example, the UE 305 may apply a PA back-off to its PA performing the uplink transmission according to the adaptive PA back-off scheme. This may include triggering the PA of the UE 305 to operate in its non-linear region, which may introduce non-linear component(s) into the uplink transmission (e.g., into the signal carrying the uplink transmission).

At 340, the network entity 310 may apply or otherwise perform DPoD operations on the uplink transmissions to reduce the transmitter-induced non-linear component(s) of the uplink transmission. For example, the network entity 310 may apply the DPoD techniques to reconstruct and eliminate the non-linear components of the uplink transmission. The network entity 310 may decode the remaining linear components of the uplink transmission to recover the information being conveyed therein.

At 345, the network entity 310 may transmit or otherwise provide (and the UE 305 may receive or otherwise obtain) a signal updating the adaptive PA back-off scheme to be applied to subsequent uplink transmissions. For example, the signal may be RRC and/or MAC-CE signaling that changes the back-off level applied to the PA of the UE 305. The signal may be a DCI signal scheduling the subsequent uplink transmission that also identifies the updated adaptive PA back-off scheme. The signal may indicate the updated EVM level and/or the updated MPR values to be set by the UE 305. The signal may indicate the updated values in absolute terms, in differential terms, and/or in relative terms, as discussed above.

Figure 4:
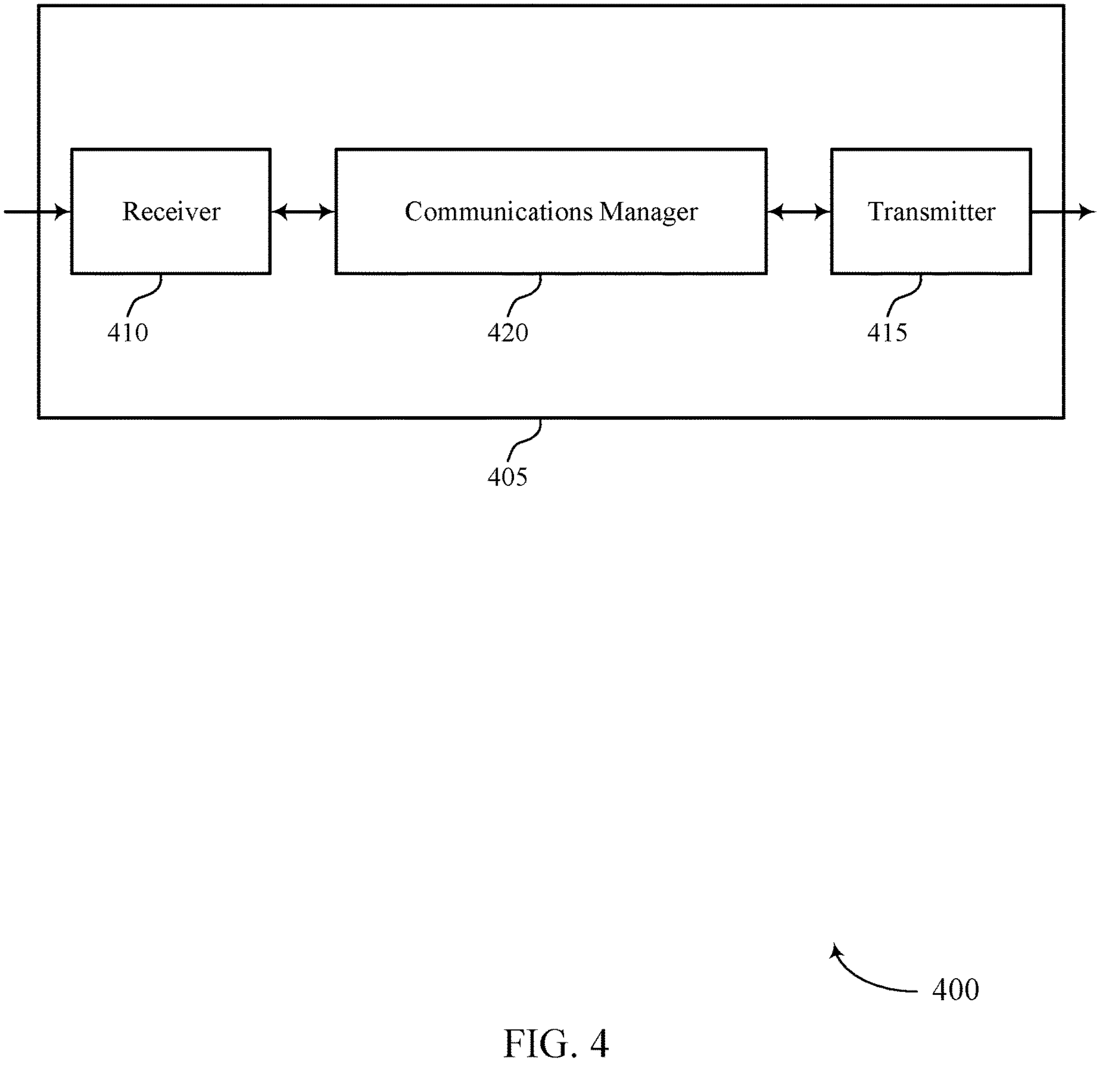
FIGS. 4 and 5 show block diagrams of devices that support adaptive PA back-off in accordance with one or more aspects of the present disclosure.

FIG. 4 shows a block diagram 400 of a device 405 that supports adaptive PA back-off in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to an adaptive PA back-off level). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to an adaptive PA back-off level). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of an adaptive PA back-off level as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting a capability message indicating support for adaptive PA back-off for uplink transmissions. The communications manager 420 is capable of, configured to, or operable to support a means for receiving, based on the capability message, an identifier for an adaptive PA back-off scheme to be applied to an uplink transmission. The communications manager 420 is capable of, configured to, or operable to support a means for performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for improving transmitter efficiency and utilization by adaptively setting and/or updating the EVM level and/or MPR value of the transmitter. This may enable operating the PA of the transmitter in a different non-linear region, with the receiver applying DPoD techniques to remove the non-linear components.

Figure 5:
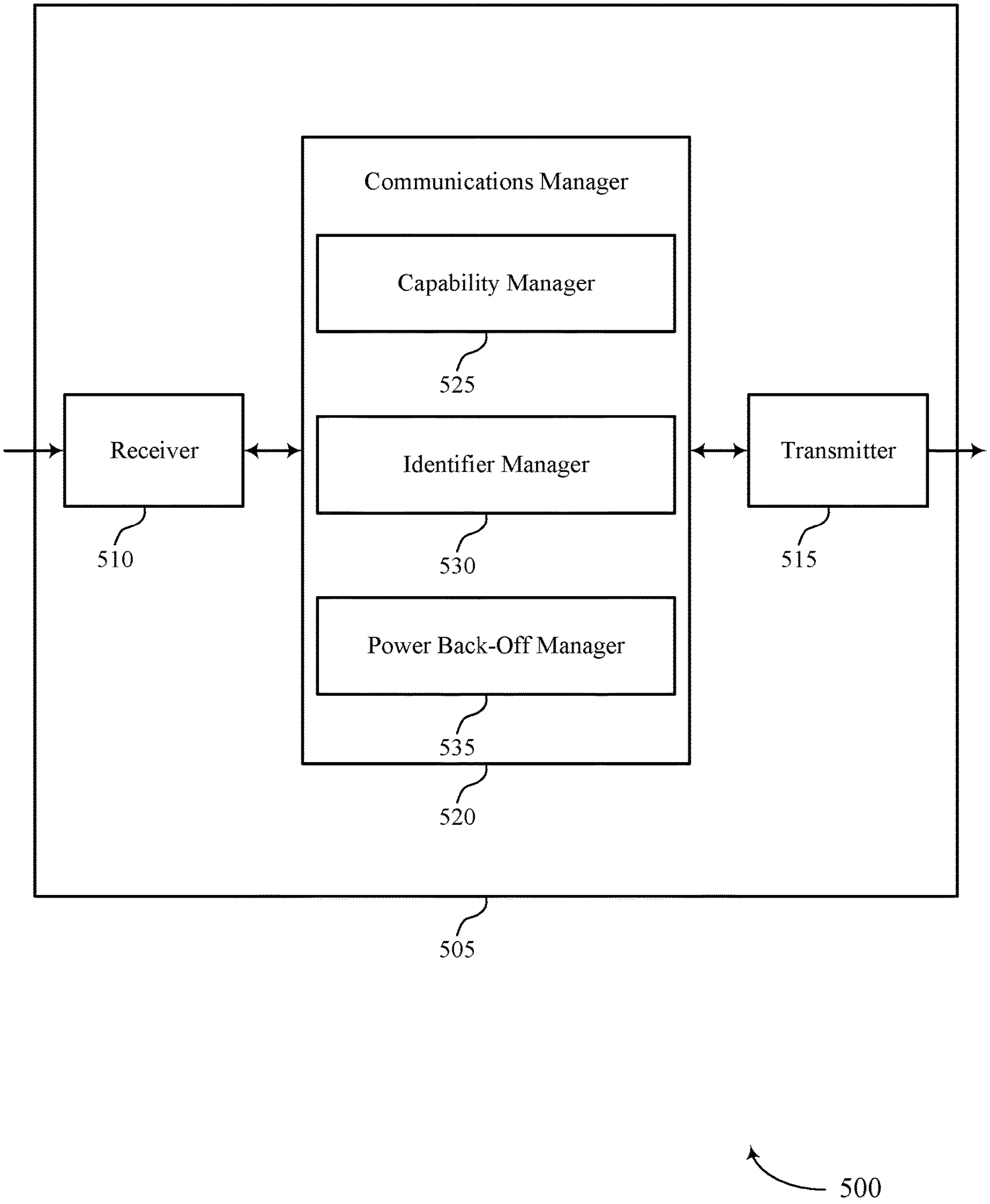

FIG. 5 shows a block diagram 500 of a device 505 that supports adaptive PA back-off in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to an adaptive PA back-off level). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to an adaptive PA back-off level). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of an adaptive PA back-off level as described herein. For example, the communications manager 520 may include a capability manager 525, an identifier manager 530, a power back-off manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability manager 525 is capable of, configured to, or operable to support a means for transmitting a capability message indicating support for adaptive PA back-off for uplink transmissions. The identifier manager 530 is capable of, configured to, or operable to support a means for receiving, based on the capability message, an identifier for an adaptive PA back-off scheme to be applied to an uplink transmission. The power back-off manager 535 is capable of, configured to, or operable to support a means for performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component.

Figure 6:
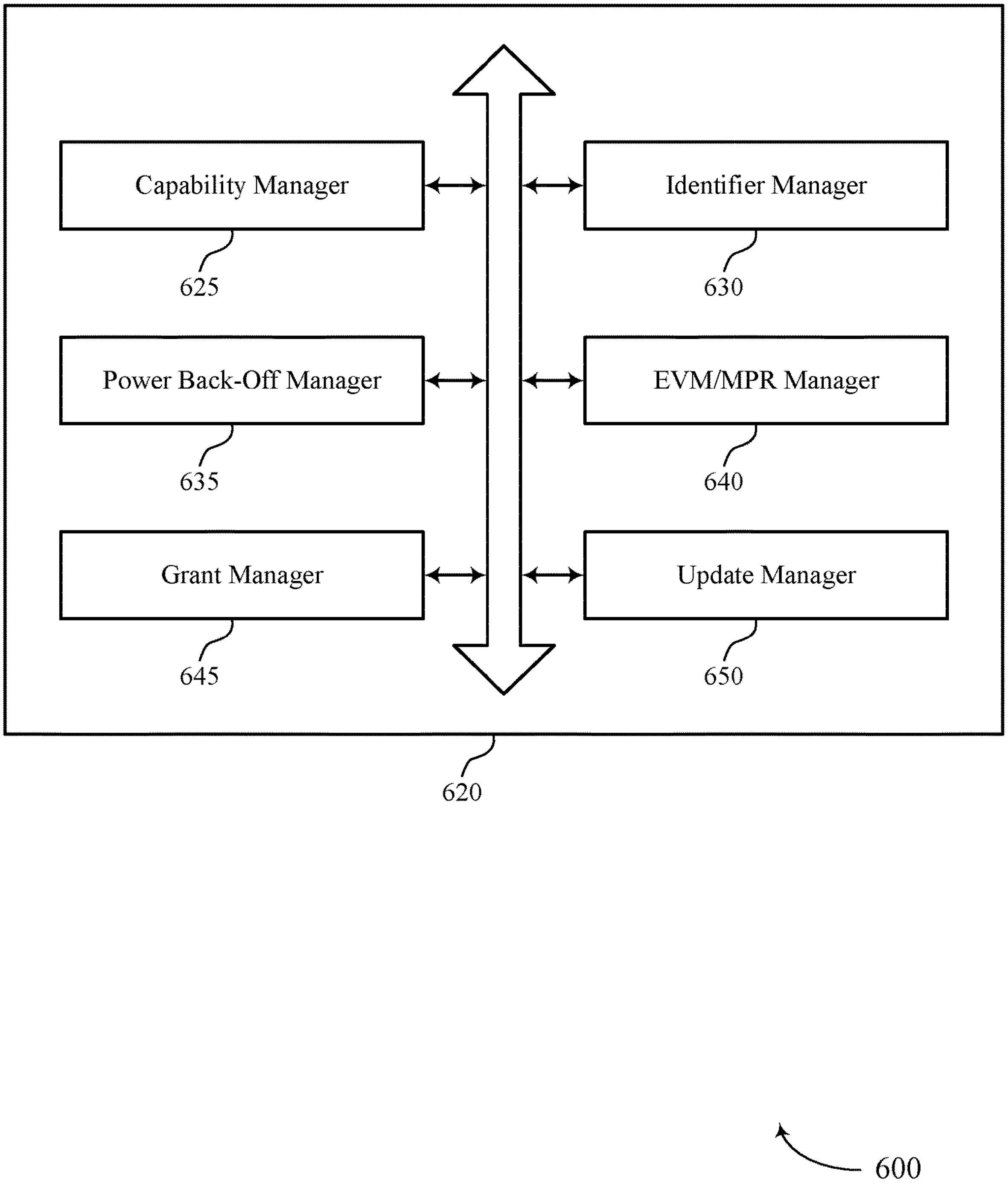
FIG. 6 shows a block diagram of a communications manager that supports adaptive PA back-off in accordance with one or more aspects of the present disclosure.

FIG. 6 shows a block diagram 600 of a communications manager 620 that supports adaptive PA back-off in accordance with one or more aspects of the present disclosure. The communications manager 620 may be an example of aspects of a communications manager 420, a communications manager 520, or both, as described herein. The communications manager 620, or various components thereof, may be an example of means for performing various aspects of an adaptive PA back-off level as described herein. For example, the communications manager 620 may include a capability manager 625, an identifier manager 630, a power back-off manager 635, an EVM/MPR manager 640, a grant manager 645, an update manager 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The capability manager 625 is capable of, configured to, or operable to support a means for transmitting a capability message indicating support for adaptive PA back-off for uplink transmissions. The identifier manager 630 is capable of, configured to, or operable to support a means for receiving, based on the capability message, an identifier for an adaptive PA back-off scheme to be applied to an uplink transmission. The power back-off manager 635 is capable of, configured to, or operable to support a means for performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component.

In some examples, the EVM/MPR manager 640 is capable of, configured to, or operable to support a means for indicating a set of supported EVM levels, a set of supported output power levels, or both, in the capability message, where the support for adaptive PA back-off is based on the set of supported EVM levels, the set of supported output power levels, or both. In some examples, the EVM/MPR manager 640 is capable of, configured to, or operable to support a means for receiving a control signal identifying a set of adaptive PA back-off schemes available for use by the UE. In some examples, the EVM/MPR manager 640 is capable of, configured to, or operable to support a means for selecting the adaptive PA back-off scheme from the set of adaptive PA back-off schemes based on the identifier. In some examples, the set of adaptive PA back-off schemes include a set of supported EVM levels, a set of supported output power levels, or both.

In some examples, the grant manager 645 is capable of, configured to, or operable to support a means for receiving a grant scheduling the uplink transmission, the grant including an uplink transmission frequency resource allocation. In some examples, the grant manager 645 is capable of, configured to, or operable to support a means for determining the identifier based on the uplink transmission frequency resource allocation. In some examples, the grant manager 645 is capable of, configured to, or operable to support a means for receiving a grant scheduling the uplink transmission, where the identifier is received in the grant.

In some examples, the update manager 650 is capable of, configured to, or operable to support a means for receiving, based on the identifier, an updated adaptive PA back-off level, where the adaptive PA back-off scheme is based on the updated adaptive PA back-off level.

In some examples, the updated adaptive PA back-off level triggers an updated EVM level, an updated output power, or both. In some examples, the adaptive PA back-off scheme is based on at least one of a cell load for a network entity the UE is communicating in, a UE-state associated with the UE, a UE-type of the UE, or any combination thereof. In some examples, to operate the PA in the non-linear region includes use of a power supply voltage applied to the PA based on the change to the EVM level. In some examples, to operate the PA in the non-linear region includes increasing an output power level of the PA based on the change to the output power.

Figure 7:
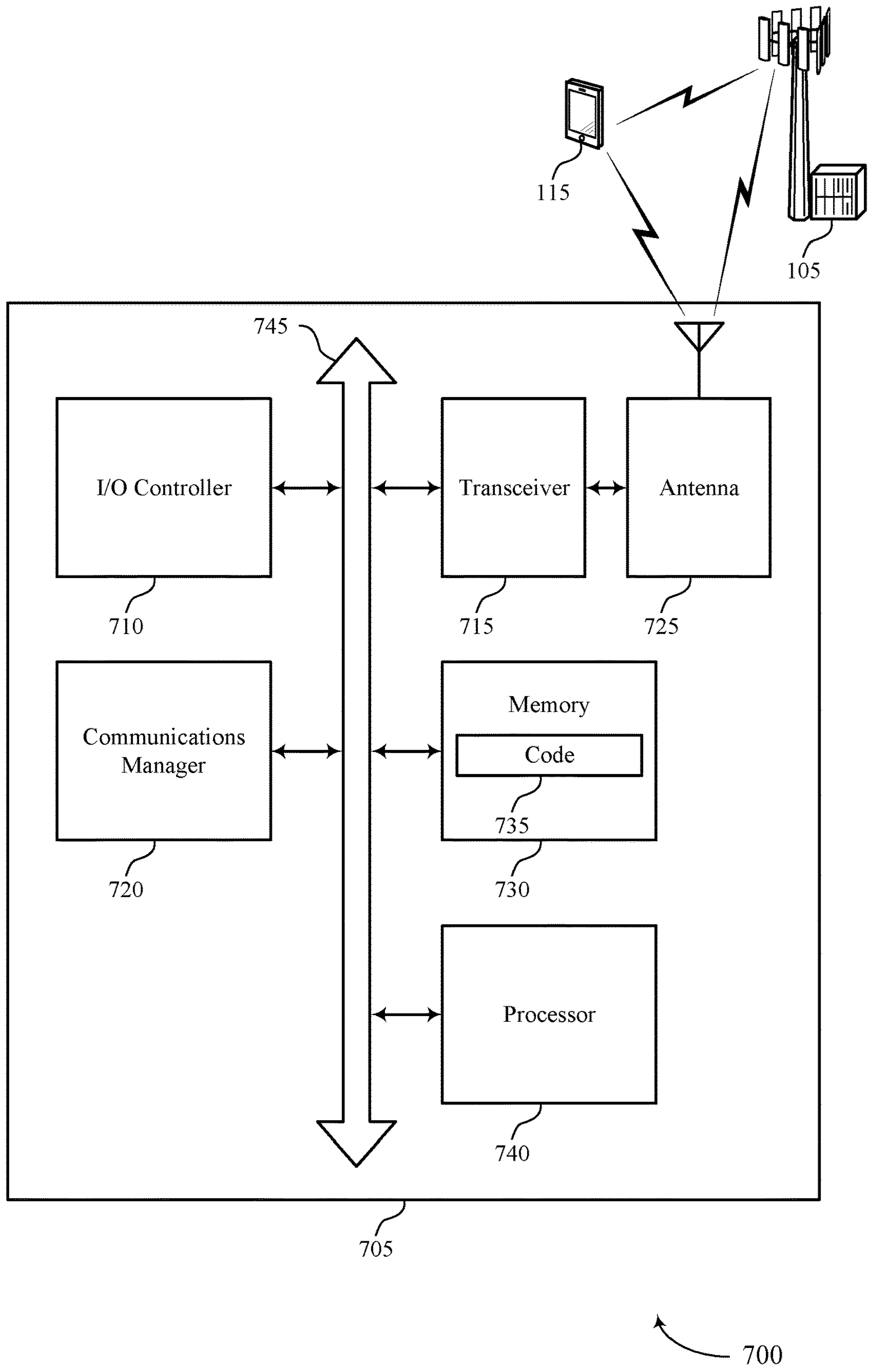
FIG. 7 shows a diagram of a system including a device that supports adaptive PA back-off in accordance with one or more aspects of the present disclosure.

FIG. 7 shows a diagram of a system 700 including a device 705 that supports adaptive PA back-off in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting an adaptive PA back-off level). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communications in accordance with examples as disclosed herein. For example, the communications manager 720 is capable of, configured to, or operable to support a means for transmitting a capability message indicating support for adaptive PA back-off for uplink transmissions. The communications manager 720 is capable of, configured to, or operable to support a means for receiving, based on the capability message, an identifier for an adaptive PA back-off scheme to be applied to an uplink transmission. The communications manager 720 is capable of, configured to, or operable to support a means for performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component.

By including or configuring the communications manager 720 in accordance with examples as described herein, the device 705 may support techniques for improving transmitter efficiency and utilization by adaptively setting and/or updating the EVM level and/or MPR value of the transmitter. This may enable operating the PA of the transmitter in a different non-linear region, with the receiver applying DPoD techniques to remove the non-linear components.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of an adaptive PA back-off level as described herein, or the at least one processor 740 and the at least one memory 730 may be otherwise configured to, individually or collectively, perform or support such operations.

Figure 8:
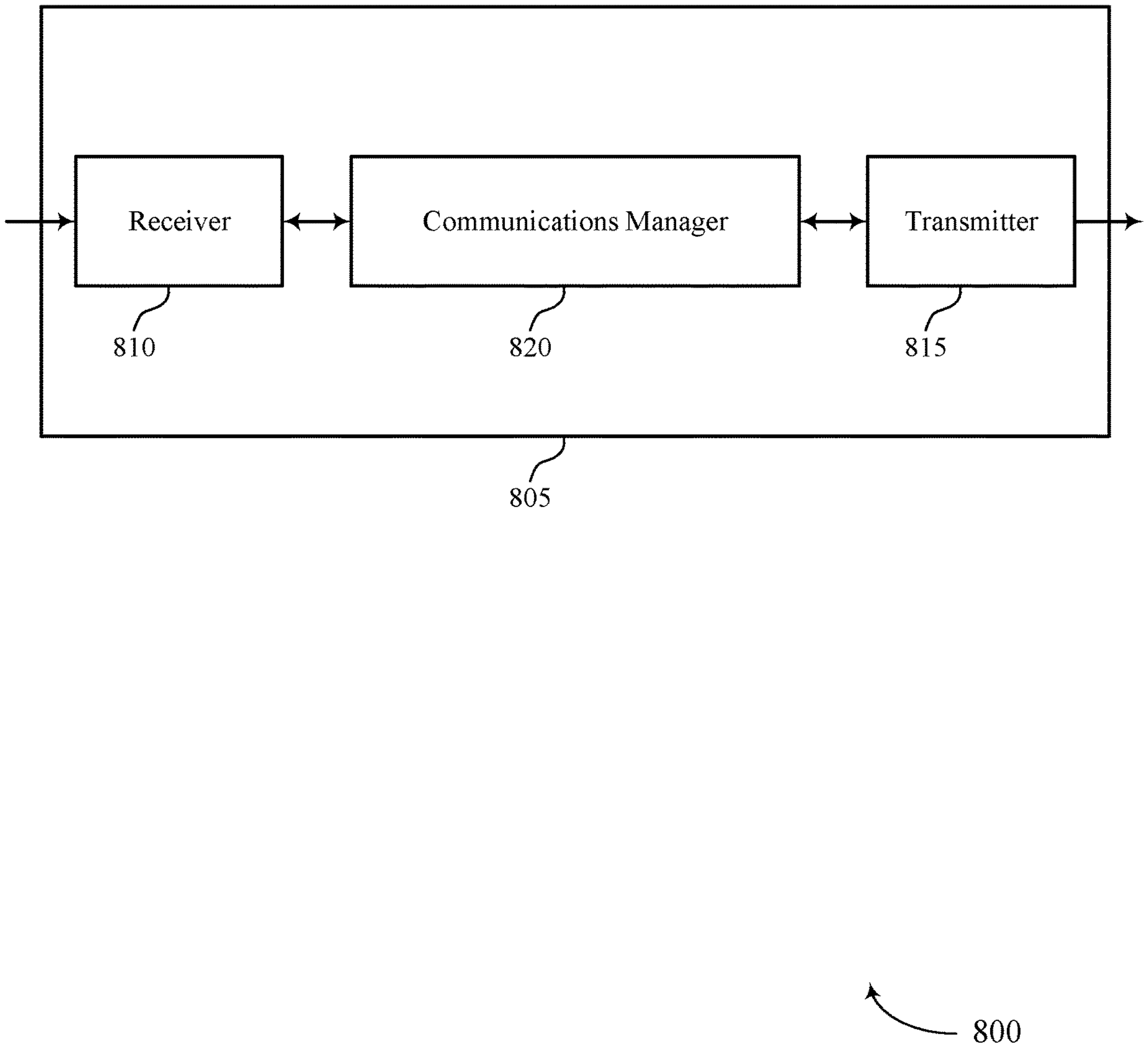
FIGS. 8 and 9 show block diagrams of devices that support adaptive PA back-off in accordance with one or more aspects of the present disclosure.

FIG. 8 shows a block diagram 800 of a device 805 that supports adaptive PA back-off in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of an adaptive PA back-off level as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving, from a UE, a capability message indicating support for adaptive PA back-off for uplink transmissions. The communications manager 820 is capable of, configured to, or operable to support a means for transmitting, based on the capability message, an identifier for an adaptive PA back-off scheme. The communications manager 820 is capable of, configured to, or operable to support a means for receiving an uplink transmission from the UE, where the uplink transmission includes a transmitter-introduced non-linear component that is due, at least in part, to the adaptive PA back-off scheme. The communications manager 820 is capable of, configured to, or operable to support a means for performing a digital post distortion operation on the uplink transmission to reduce the transmitter-introduced non-linear component of the uplink transmission.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for improving transmitter efficiency and utilization by adaptively setting and/or updating the EVM level and/or MPR value of the transmitter. This may enable operating the PA of the transmitter in a different non-linear region, with the receiver applying DPoD techniques to remove the non-linear components.

Figure 9:
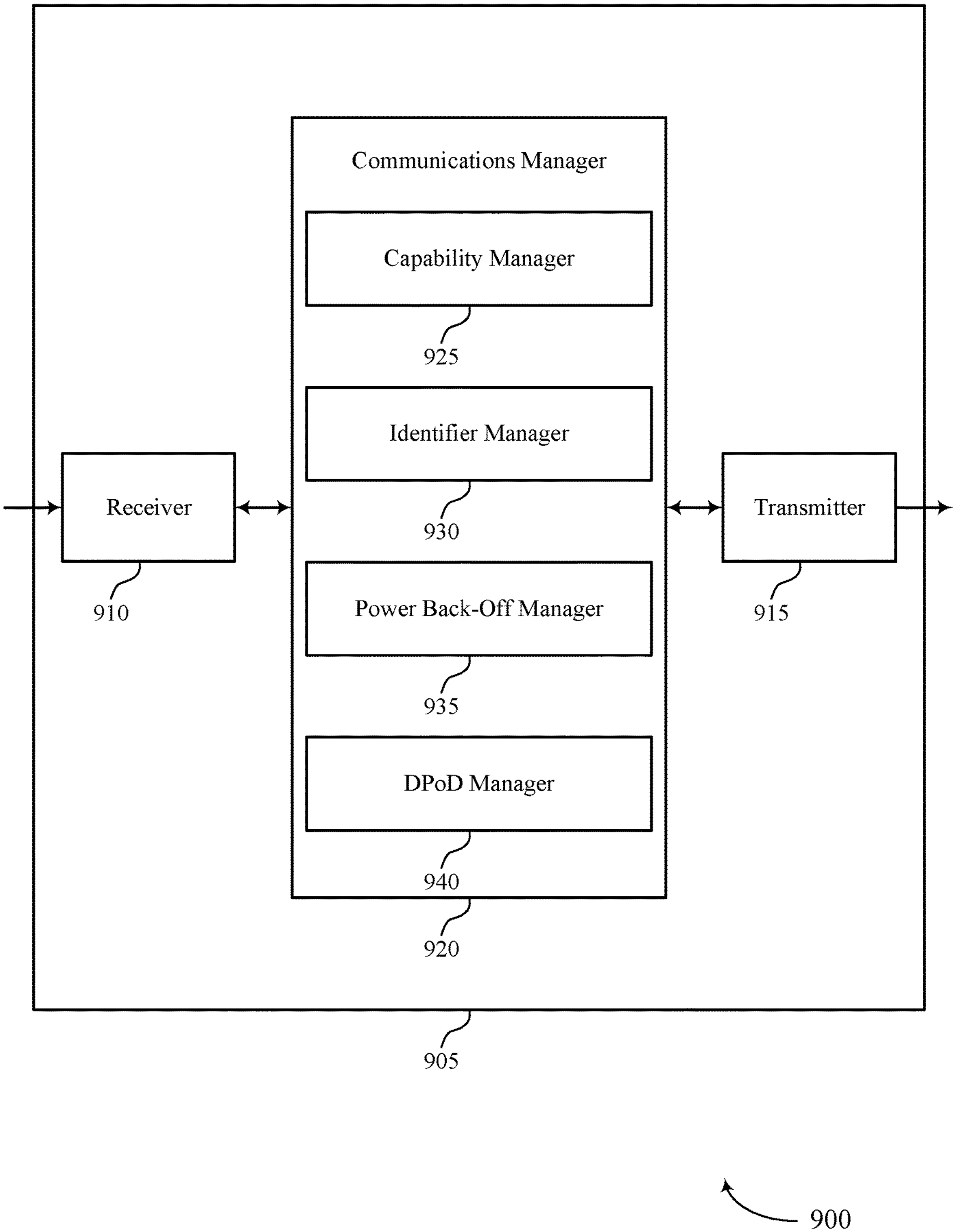

FIG. 9 shows a block diagram 900 of a device 905 that supports adaptive PA back-off in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of an adaptive PA back-off level as described herein. For example, the communications manager 920 may include a capability manager 925, an identifier manager 930, a power back-off manager 935, a DPoD manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The capability manager 925 is capable of, configured to, or operable to support a means for receiving, from a UE, a capability message indicating support for adaptive PA back-off for uplink transmissions. The identifier manager 930 is capable of, configured to, or operable to support a means for transmitting, based on the capability message, an identifier for an adaptive PA back-off scheme. The power back-off manager 935 is capable of, configured to, or operable to support a means for receiving an uplink transmission from the UE, where the uplink transmission includes a transmitter-introduced non-linear component that is due, at least in part, to the adaptive PA back-off scheme. The DPoD manager 940 is capable of, configured to, or operable to support a means for performing a digital post distortion operation on the uplink transmission to reduce the transmitter-introduced non-linear component of the uplink transmission.

Figure 10:
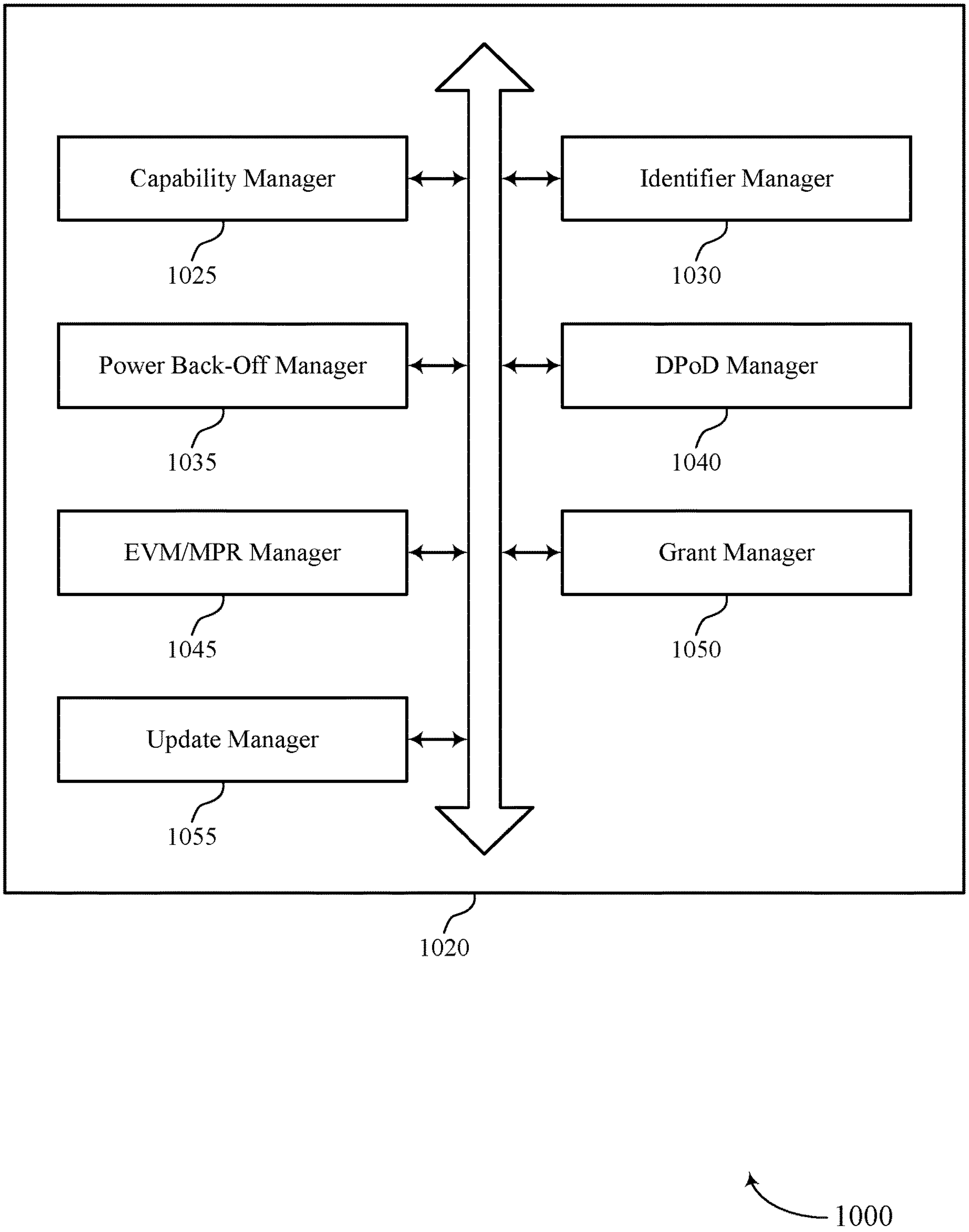
FIG. 10 shows a block diagram of a communications manager that supports adaptive PA back-off in accordance with one or more aspects of the present disclosure.

FIG. 10 shows a block diagram 1000 of a communications manager 1020 that supports adaptive PA back-off in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of an adaptive PA back-off level as described herein. For example, the communications manager 1020 may include a capability manager 1025, an identifier manager 1030, a power back-off manager 1035, a DPoD manager 1040, an EVM/MPR manager 1045, a grant manager 1050, an update manager 1055, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The capability manager 1025 is capable of, configured to, or operable to support a means for receiving, from a UE, a capability message indicating support for adaptive PA back-off for uplink transmissions. The identifier manager 1030 is capable of, configured to, or operable to support a means for transmitting, based on the capability message, an identifier for an adaptive PA back-off scheme. The power back-off manager 1035 is capable of, configured to, or operable to support a means for receiving an uplink transmission from the UE, where the uplink transmission includes a transmitter-introduced non-linear component that is due, at least in part, to the adaptive PA back-off scheme. The DPoD manager 1040 is capable of, configured to, or operable to support a means for performing a digital post distortion operation on the uplink transmission to reduce the transmitter-introduced non-linear component of the uplink transmission.

In some examples, the EVM/MPR manager 1045 is capable of, configured to, or operable to support a means for selecting the adaptive PA back-off scheme based on a set of supported EVM levels, a set of supported output power levels, or both, indicated in the capability message. In some examples, the EVM/MPR manager 1045 is capable of, configured to, or operable to support a means for transmitting a control signal identifying a set of adaptive PA back-off schemes available for use by the UE, where the adaptive PA back-off scheme is selected from the set of adaptive PA back-off schemes based on the identifier. In some examples, the set of adaptive PA back-off schemes include a set of supported EVM levels, a set of supported output power levels, or both.

In some examples, the grant manager 1050 is capable of, configured to, or operable to support a means for transmitting a grant scheduling the uplink transmission, the grant including an uplink transmission frequency resource allocation, where the identifier is based on the uplink transmission frequency resource allocation. In some examples, the grant manager 1050 is capable of, configured to, or operable to support a means for transmitting a grant scheduling the uplink transmission, where the identifier is indicated in the grant.

In some examples, the update manager 1055 is capable of, configured to, or operable to support a means for transmitting, based on the identifier, an updated adaptive PA back-off level, where the adaptive PA back-off scheme is based on the updated adaptive PA back-off level.

In some examples, the updated adaptive PA back-off level triggers an updated EVM level, an updated output power, or both. In some examples, the adaptive PA back-off scheme is based on at least one of a cell load of the network entity, a UE-state associated with the UE, a UE-type of the UE, or any combination thereof.

Figure 11:
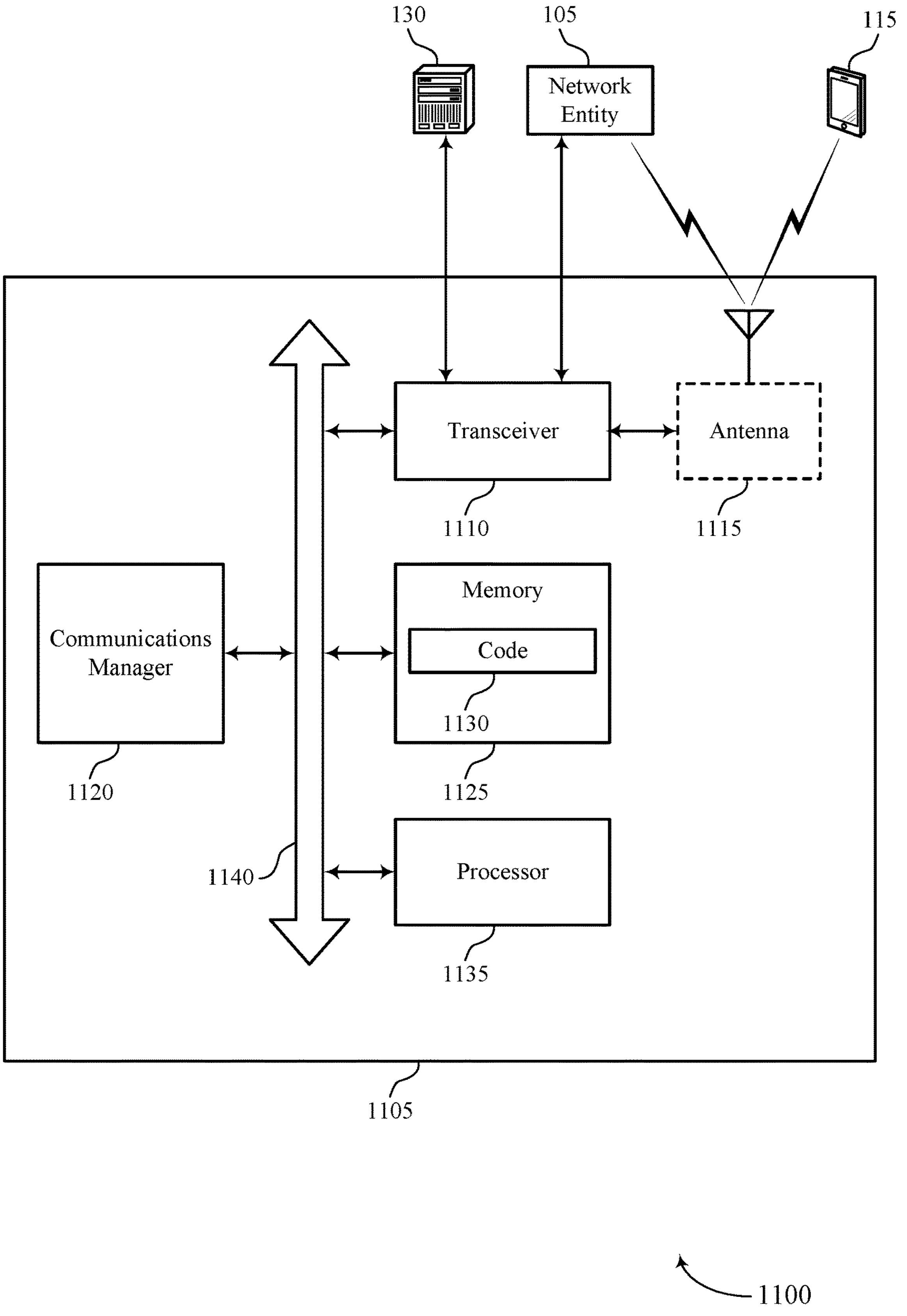
FIG. 11 shows a diagram of a system including a device that supports adaptive PA back-off in accordance with one or more aspects of the present disclosure.

FIG. 11 shows a diagram of a system 1100 including a device 1105 that supports adaptive PA back-off in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting an adaptive PA back-off level). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some implementations, the at least one processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the at least one processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving, from a UE, a capability message indicating support for adaptive PA back-off for uplink transmissions. The communications manager 1120 is capable of, configured to, or operable to support a means for transmitting, based on the capability message, an identifier for an adaptive PA back-off scheme. The communications manager 1120 is capable of, configured to, or operable to support a means for receiving an uplink transmission from the UE, where the uplink transmission includes a transmitter-introduced non-linear component that is due, at least in part, to the adaptive PA back-off scheme. The communications manager 1120 is capable of, configured to, or operable to support a means for performing a digital post distortion operation on the uplink transmission to reduce the transmitter-introduced non-linear component of the uplink transmission.

By including or configuring the communications manager 1120 in accordance with examples as described herein, the device 1105 may support techniques for improving transmitter efficiency and utilization by adaptively setting and/or updating the EVM level and/or MPR value of the transmitter. This may enable operating the PA of the transmitter in a different non-linear region, with the receiver applying DPoD techniques to remove the non-linear components.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of an adaptive PA back-off level as described herein, or the at least one processor 1135 and the at least one memory 1125 may be otherwise configured to, individually or collectively, perform or support such operations.

Figure 12:
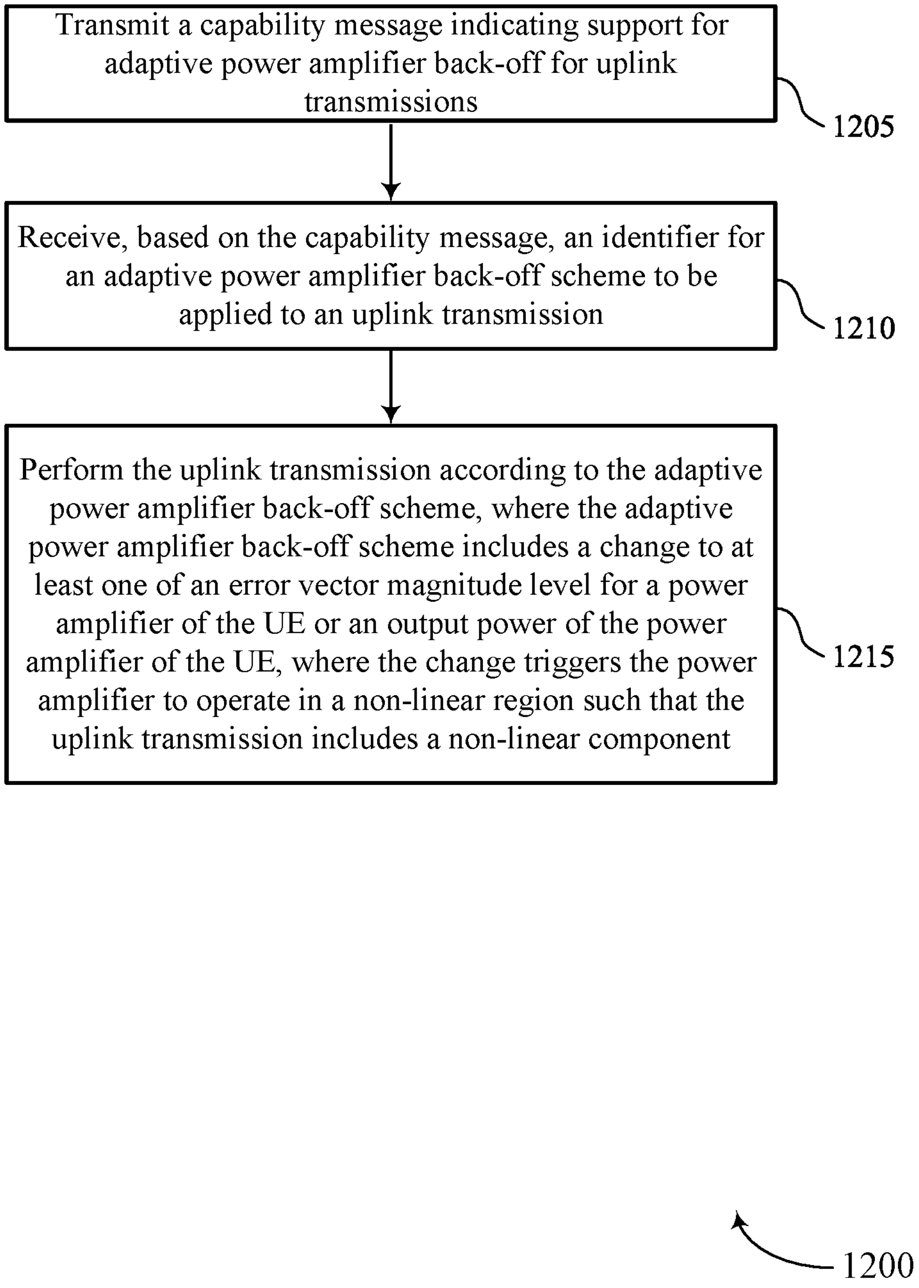
FIGS. 12 through 16 show flowcharts illustrating methods that support adaptive PA back-off in accordance with one or more aspects of the present disclosure.

FIG. 12 shows a flowchart illustrating a method 1200 that supports adaptive PA back-off in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting a capability message indicating support for adaptive PA back-off for uplink transmissions. The operations of block 1205 may be performed in accordance with examples as disclosed herein. In some examples, aspects of the operations of 1205 may be performed by a capability manager 625 as described with reference to FIG. 6.

At 1210, the method may include receiving, based on the capability message, an identifier for an adaptive PA back-off scheme to be applied to an uplink transmission. The operations of block 1210 may be performed in accordance with examples as disclosed herein. In some examples, aspects of the operations of 1210 may be performed by an identifier manager 630 as described with reference to FIG. 6.

At 1215, the method may include performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component. The operations of block 1215 may be performed in accordance with examples as disclosed herein. In some examples, aspects of the operations of 1215 may be performed by a power back-off manager 635 as described with reference to FIG. 6.

Figure 13:
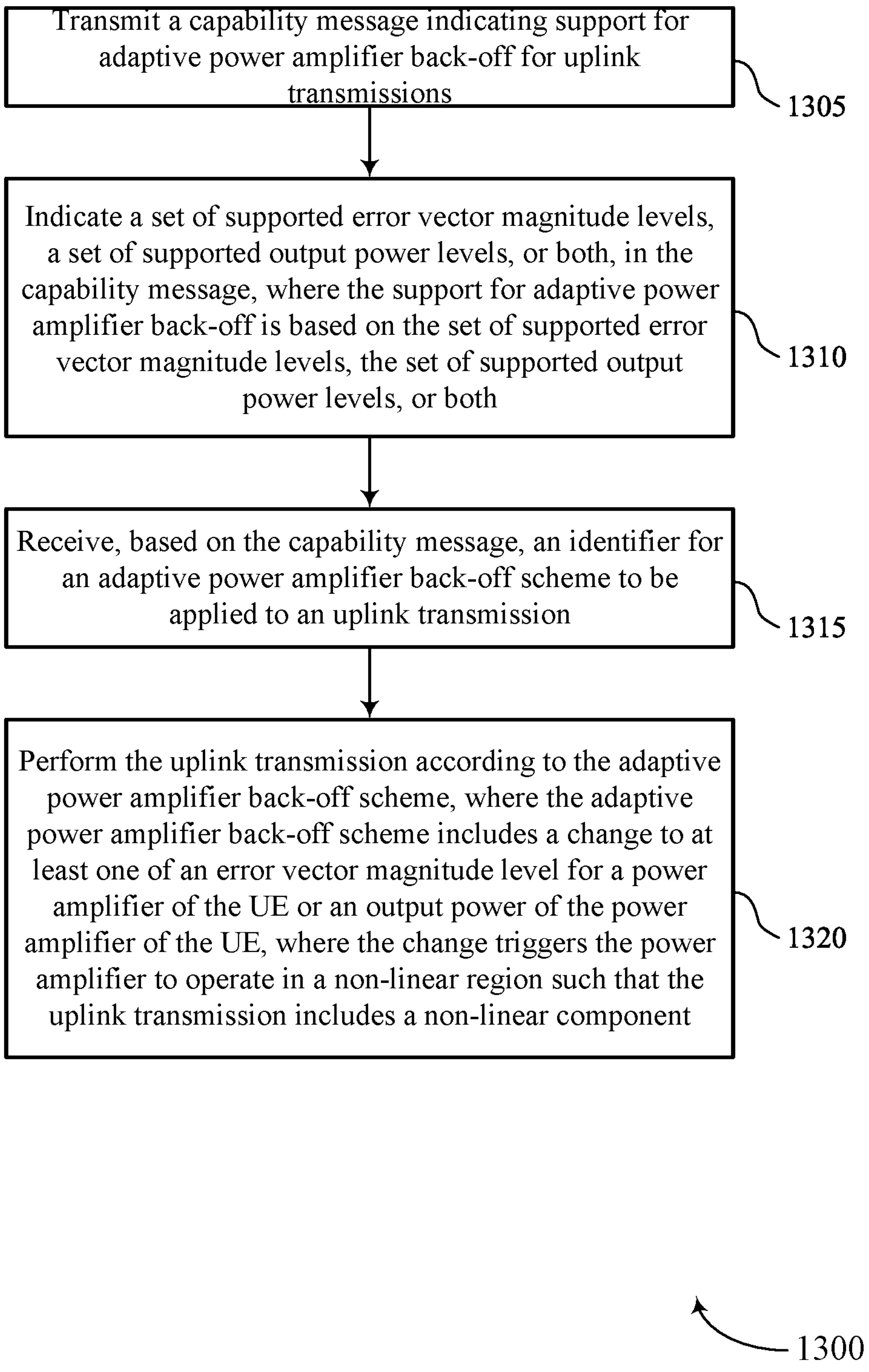

FIG. 13 shows a flowchart illustrating a method 1300 that supports adaptive PA back-off in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting a capability message indicating support for adaptive PA back-off for uplink transmissions. The operations of block 1305 may be performed in accordance with examples as disclosed herein. In some examples, aspects of the operations of 1305 may be performed by a capability manager 625 as described with reference to FIG. 6.

At 1310, the method may include indicating a set of supported EVM levels, a set of supported output power levels, or both, in the capability message, where the support for adaptive PA back-off is based on the set of supported EVM levels, the set of supported output power levels, or both. The operations of block 1310 may be performed in accordance with examples as disclosed herein. In some examples, aspects of the operations of 1310 may be performed by an EVM/MPR manager 640 as described with reference to FIG. 6.

At 1315, the method may include receiving, based on the capability message, an identifier for an adaptive PA back-off scheme to be applied to an uplink transmission. The operations of block 1315 may be performed in accordance with examples as disclosed herein. In some examples, aspects of the operations of 1315 may be performed by an identifier manager 630 as described with reference to FIG. 6.

At 1320, the method may include performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component. The operations of block 1320 may be performed in accordance with examples as disclosed herein. In some examples, aspects of the operations of 1320 may be performed by a power back-off manager 635 as described with reference to FIG. 6.

Figure 14:
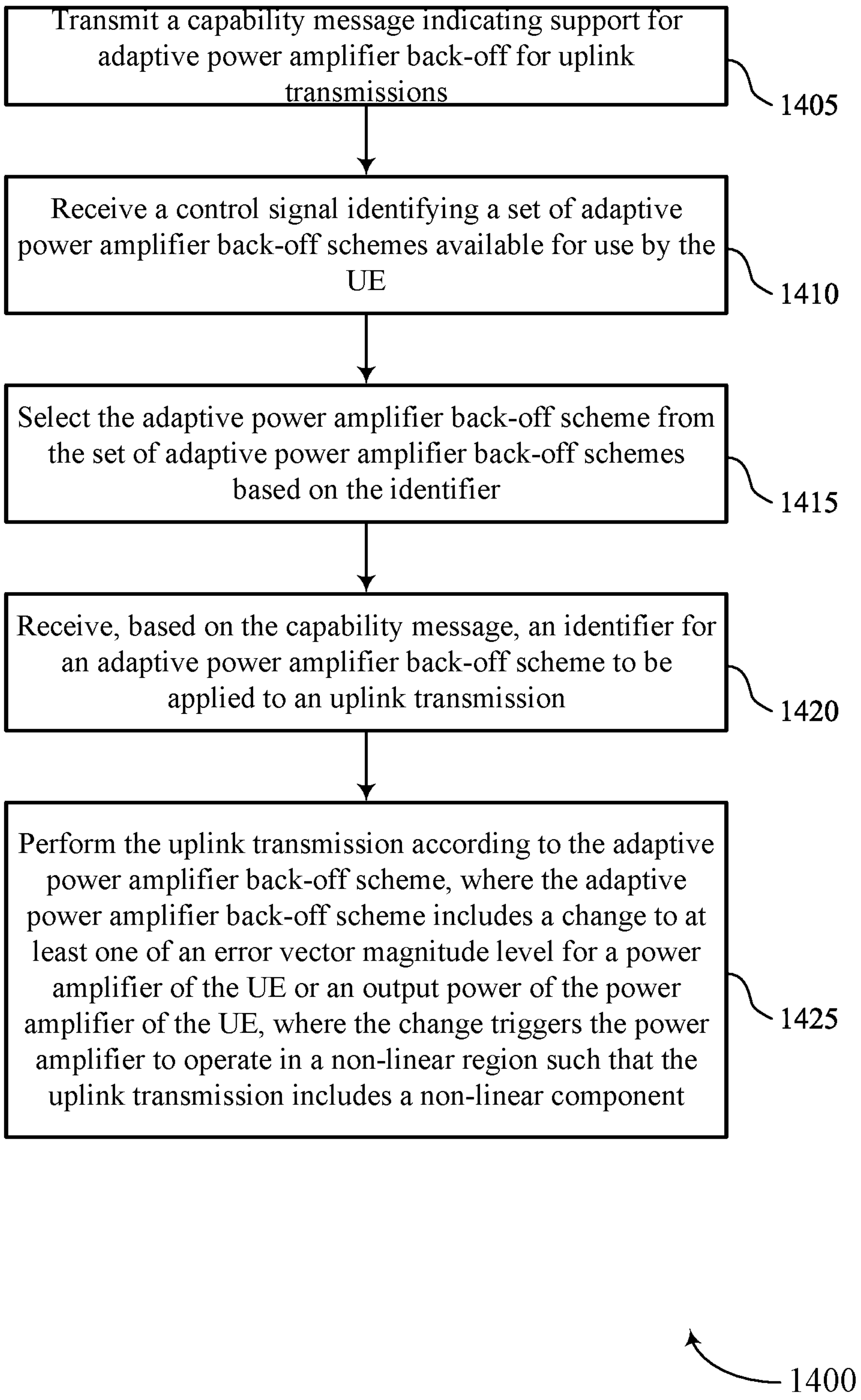

FIG. 14 shows a flowchart illustrating a method 1400 that supports adaptive PA back-off in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating support for adaptive PA back-off for uplink transmissions. The operations of block 1405 may be performed in accordance with examples as disclosed herein.

In some examples, aspects of the operations of 1405 may be performed by a capability manager 625 as described with reference to FIG. 6.

At 1410, the method may include receiving a control signal identifying a set of adaptive PA back-off schemes available for use by the UE. The operations of block 1410 may be performed in accordance with examples as disclosed herein. In some examples, aspects of the operations of 1410 may be performed by an EVM/MPR manager 640 as described with reference to FIG. 6.

At 1415, the method may include selecting the adaptive PA back-off scheme from the set of adaptive PA back-off schemes based on the identifier. The operations of block 1415 may be performed in accordance with examples as disclosed herein. In some examples, aspects of the operations of 1415 may be performed by an EVM/MPR manager 640 as described with reference to FIG. 6.

At 1420, the method may include receiving, based on the capability message, an identifier for an adaptive PA back-off scheme to be applied to an uplink transmission. The operations of block 1420 may be performed in accordance with examples as disclosed herein. In some examples, aspects of the operations of 1420 may be performed by an identifier manager 630 as described with reference to FIG. 6.

At 1425, the method may include performing the uplink transmission according to the adaptive PA back-off scheme, where the adaptive PA back-off scheme includes a change to at least one of an EVM level for a PA of the UE or an output power of the PA of the UE, where the change triggers the PA to operate in a non-linear region such that the uplink transmission includes a non-linear component. The operations of block 1425 may be performed in accordance with examples as disclosed herein. In some examples, aspects of the operations of 1425 may be performed by a power back-off manager 635 as described with reference to FIG. 6.

Figure 15:
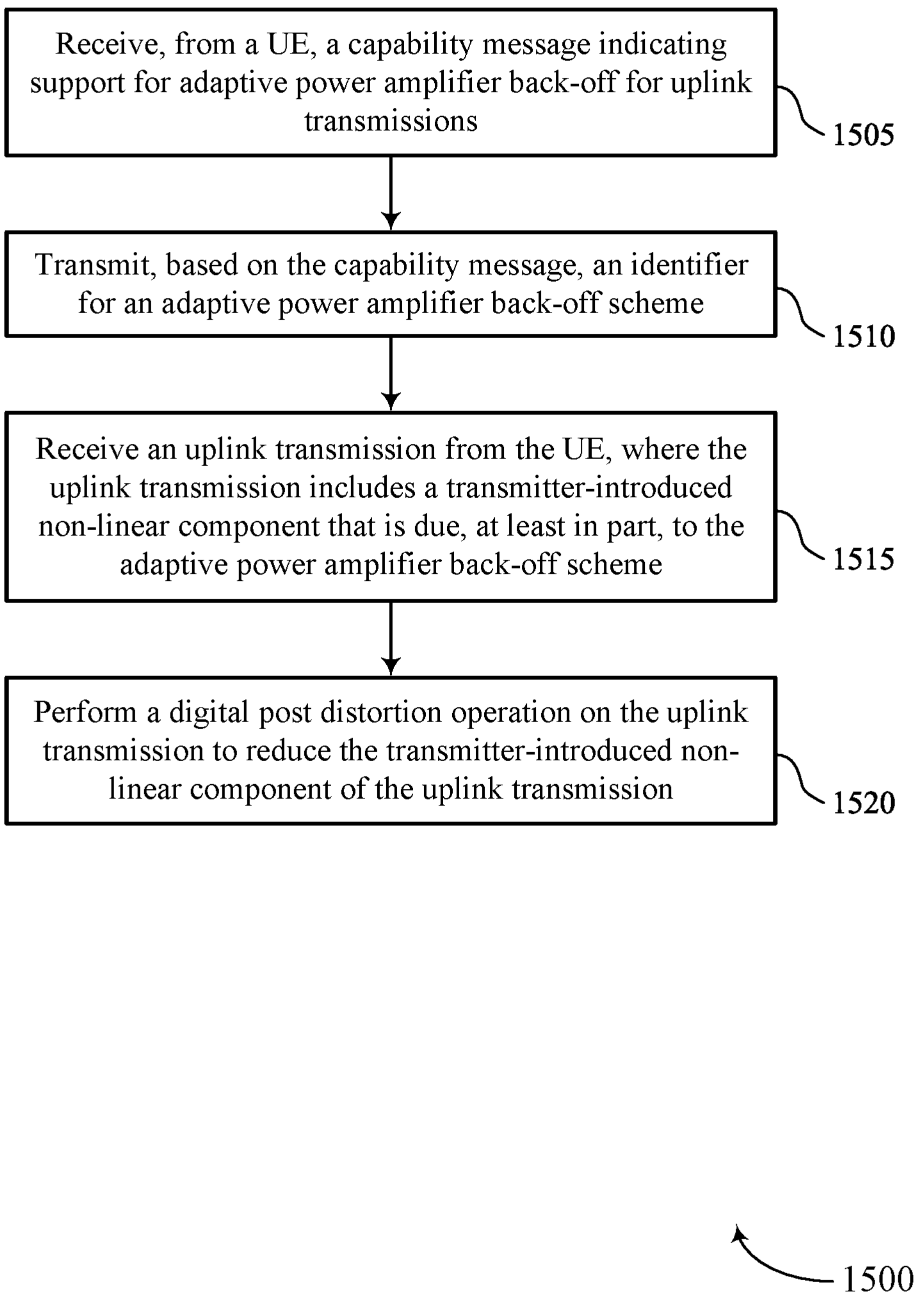

FIG. 15 shows a flowchart illustrating a method 1500 that supports adaptive PA back-off in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a UE, a capability message indicating support for adaptive PA back-off for uplink transmissions. The operations of block 1505 may be performed in accordance with examples as disclosed herein. In some examples, aspects of the operations of 1505 may be performed by a capability manager 1025 as described with reference to FIG. 10.

At 1510, the method may include transmitting, based on the capability message, an identifier for an adaptive PA back-off scheme. The operations of block 1510 may be performed in accordance with examples as disclosed herein. In some examples, aspects of the operations of 1510 may be performed by an identifier manager 1030 as described with reference to FIG. 10.

At 1515, the method may include receiving an uplink transmission from the UE, where the uplink transmission includes a transmitter-introduced non-linear component that is due, at least in part, to the adaptive PA back-off scheme. The operations of block 1515 may be performed in accordance with examples as disclosed herein. In some examples, aspects of the operations of 1515 may be performed by a power back-off manager 1035 as described with reference to FIG. 10.

At 1520, the method may include performing a digital post distortion operation on the uplink transmission to reduce the transmitter-introduced non-linear component of the uplink transmission. The operations of block 1520 may be performed in accordance with examples as disclosed herein. In some examples, aspects of the operations of 1520 may be performed by a DPoD manager 1040 as described with reference to FIG. 10.

Figure 16:
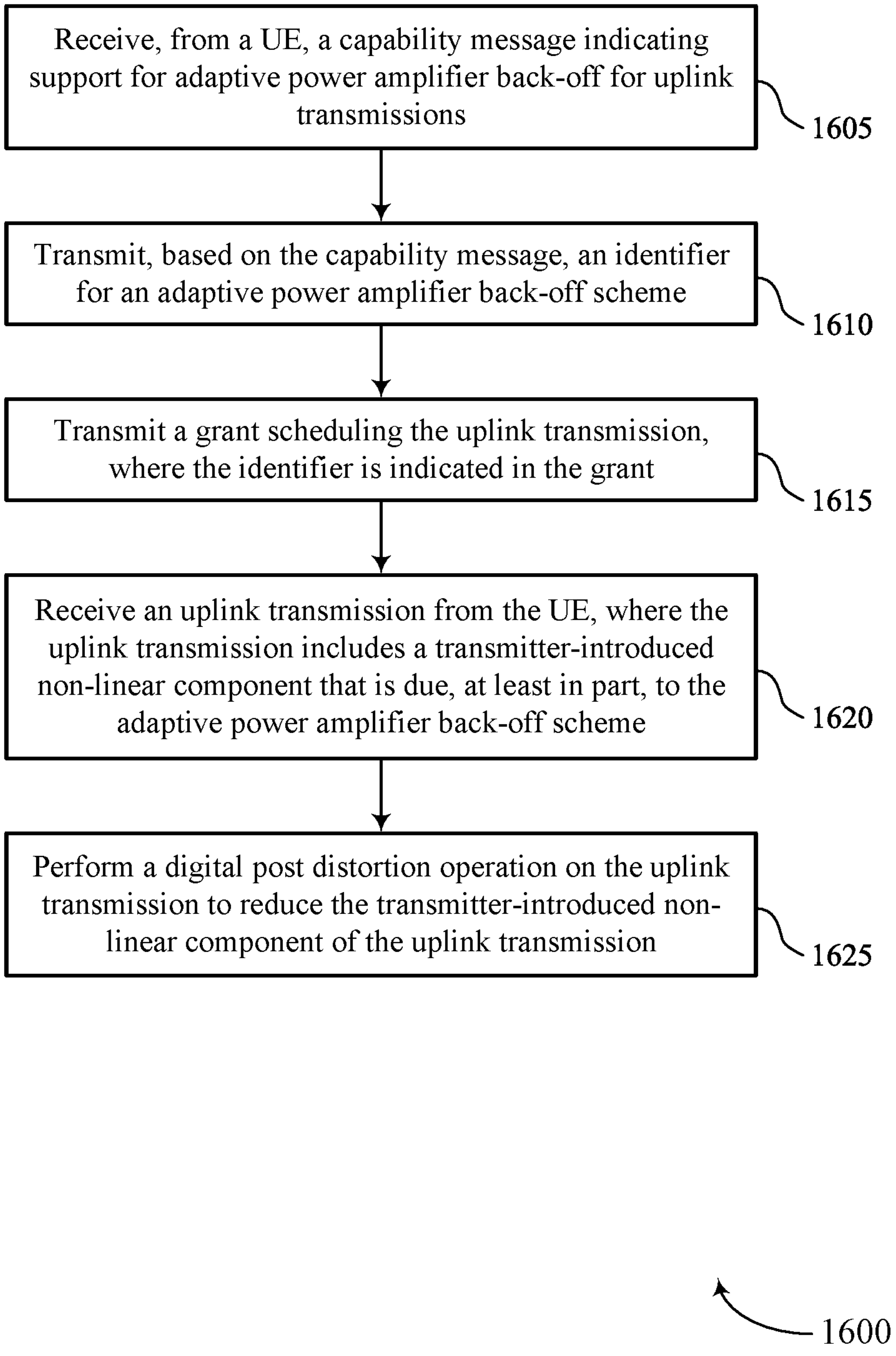

FIG. 16 shows a flowchart illustrating a method 1600 that supports adaptive PA back-off in accordance with aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a capability message indicating support for adaptive PA back-off for uplink transmissions. The operations of block 1605 may be performed in accordance with examples as disclosed herein. In some examples, aspects of the operations of 1605 may be performed by a capability manager 1025 as described with reference to FIG. 10.

At 1610, the method may include transmitting, based on the capability message, an identifier for an adaptive PA back-off scheme. The operations of block 1610 may be performed in accordance with examples as disclosed herein. In some examples, aspects of the operations of 1610 may be performed by an identifier manager 1030 as described with reference to FIG. 10.

At 1615, the method may include transmitting a grant scheduling the uplink transmission, where the identifier is indicated in the grant. The operations of block 1615 may be performed in accordance with examples as disclosed herein. In some examples, aspects of the operations of 1615 may be performed by a grant manager 1050 as described with reference to FIG. 10.

At 1620, the method may include receiving an uplink transmission from the UE, where the uplink transmission includes a transmitter-introduced non-linear component that is due, at least in part, to the adaptive PA back-off scheme. The operations of block 1620 may be performed in accordance with examples as disclosed herein. In some examples, aspects of the operations of 1620 may be performed by a power back-off manager 1035 as described with reference to FIG. 10.

At 1625, the method may include performing a digital post distortion operation on the uplink transmission to reduce the transmitter-introduced non-linear component of the uplink transmission. The operations of block 1625 may be performed in accordance with examples as disclosed herein. In some examples, aspects of the operations of 1625 may be performed by a DPoD manager 1040 as described with reference to FIG. 10.

The following provides an overview of aspects of the present disclosure:

Aspect 1: A method for wireless communications at a UE, comprising: transmitting a capability message indicating support for adaptive PA backoff for uplink transmissions; receiving, based at least in part on the capability message, an identifier for an adaptive PA backoff scheme to be applied to an uplink transmission; and performing the uplink transmission according to the adaptive PA backoff scheme, wherein the adaptive PA backoff scheme comprises a change to at least one of an EVM level for a PA of the UE or an output power of the PA of the UE, wherein the change triggers the PA to operate in a non-linear region such that the uplink transmission includes a non-linear component.

Aspect 2: The method of aspect 1, further comprising: indicating a set of supported EVM levels, a set of supported output power levels, or both, in the capability message, wherein the support for adaptive PA backoff is based at least in part on the set of supported EVM levels, the set of supported output power levels, or both.

Aspect 3: The method of any of aspects 1 through 2, further comprising: receiving a control signal identifying a set of adaptive PA backoff schemes available for use by the UE; and selecting the adaptive PA backoff scheme from the set of adaptive PA backoff schemes based at least in part on the identifier.

Aspect 4: The method of aspect 3, wherein the set of adaptive PA backoff schemes comprise a set of supported EVM levels, a set of supported output power levels, or both.

Aspect 5: The method of any of aspects 1 through 4, further comprising: receiving a grant scheduling the uplink transmission, the grant comprising an uplink transmission frequency resource allocation; and determining the identifier based at least in part on the uplink transmission frequency resource allocation.

Aspect 6: The method of any of aspects 1 through 5, further comprising: receiving a grant scheduling the uplink transmission, wherein the identifier is received in the grant.

Aspect 7: The method of any of aspects 1 through 6, further comprising: receiving, based at least in part on the identifier, an updated adaptive PA backoff level, wherein the adaptive PA backoff scheme is based at least in part on the updated adaptive PA backoff level.

Aspect 8: The method of aspect 7, wherein the updated adaptive PA backoff level triggers an updated EVM level, an updated output power, or both.

Aspect 9: The method of any of aspects 1 through 8, wherein the adaptive PA backoff scheme is based on at least one of a cell load for a network entity the UE is communicating in, a UE-state associated with the UE, a UE-type of the UE, or any combination thereof.

Aspect 10: The method of any of aspects 1 through 9, wherein to operate the PA in the non-linear region includes use of a power supply voltage applied to the PA based on the change to the EVM level.

Aspect 11: The method of any of aspects 1 through 10, wherein to operate the PA in the non-linear region includes increasing an output power level of the PA based on the change to the output power.

Aspect 12: A method for wireless communications at a network entity, comprising: receiving, from a UE, a capability message indicating support for adaptive PA backoff for uplink transmissions; transmitting, based at least in part on the capability message, an identifier for an adaptive PA backoff scheme; receiving an uplink transmission from the UE, wherein the uplink transmission includes a transmitter-introduced non-linear component that is due, at least in part, to the adaptive PA backoff scheme; and performing a DPoD operation on the uplink transmission to reduce the transmitter-introduced non-linear component of the uplink transmission.

Aspect 13: The method of aspect 12, further comprising: selecting the adaptive PA backoff scheme based at least in part on a set of supported EVM levels, a set of supported output power levels, or both, indicated in the capability message.

Aspect 14: [Signaling Options, RRC-configured] The method of any of aspects 12 through 13, further comprising: transmitting a control signal identifying a set of adaptive PA backoff schemes available for use by the UE, wherein the adaptive PA backoff scheme is selected from the set of adaptive PA backoff schemes based at least in part on the identifier.

Aspect 15: The method of aspect 14, wherein the set of adaptive PA backoff schemes comprise a set of supported EVM levels, a set of supported output power levels, or both.

Aspect 16: The method of any of aspects 12 through 15, further comprising: transmitting a grant scheduling the uplink transmission, the grant comprising an uplink transmission frequency resource allocation, wherein the identifier is based at least in part on the uplink transmission frequency resource allocation.

Aspect 17: The method of any of aspects 12 through 16, further comprising: transmitting a grant scheduling the uplink transmission, wherein the identifier is indicated in the grant.

Aspect 18: The method of any of aspects 12 through 17, further comprising: transmitting, based at least in part on the identifier, an updated adaptive PA backoff level, wherein the adaptive PA backoff scheme is based at least in part on the updated adaptive PA backoff level.

Aspect 19: The method of aspect 18, wherein the updated adaptive PA backoff level triggers an updated EVM level, an updated output power, or both.

Aspect 20: The method of any of aspects 12 through 19, wherein the adaptive PA backoff scheme is based on at least one of a cell load of the network entity, a UE-state associated with the UE, a UE-type of the UE, or any combination thereof.

Aspect 21: A UE for wireless communications, comprising one or more memories storing processor-executable code, and one or more processors coupled with the one or more memories and individually or collectively operable to execute the code to cause the UE to perform a method of any of aspects 1 through 11.

Aspect 22: A UE for wireless communications, comprising at least one means for performing a method of any of aspects 1 through 11.

Aspect 23: A non-transitory computer-readable medium storing code for wireless communications, the code comprising instructions executable by a processor to perform a method of any of aspects 1 through 11.

Aspect 24: A network entity for wireless communications, comprising one or more memories storing processor-executable code, and one or more processors coupled with the one or more memories and individually or collectively operable to execute the code to cause the network entity to perform a method of any of aspects 12 through 20.

Aspect 25: A network entity for wireless communications, comprising at least one means for performing a method of any of aspects 12 through 20.

Aspect 26: A non-transitory computer-readable medium storing code for wireless communications, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit a capability message indicating support for adaptive power amplifier back-off for uplink transmissions, wherein the capability message indicates a set of supported error vector magnitude levels, a set of supported output power levels, or both, and wherein the support for adaptive power amplifier back-off is based at least in part on the set of supported error vector magnitude levels, the set of supported output power levels, or both;

receive, based at least in part on the capability message, an identifier for an adaptive power amplifier back-off scheme to be applied to an uplink transmission; and perform the uplink transmission according to the adaptive power amplifier back-off scheme, wherein the adaptive power amplifier back-off scheme comprises a change to at least one of an error vector magnitude level for a power amplifier of the UE or an output power of the power amplifier of the UE, wherein the change triggers the power amplifier to operate in a non-linear region such that the uplink transmission includes a non-linear component.

2. The UE of claim 1, wherein the one or more processors are individually or collectively further operable to execute the code to cause the UE to:

receive a control signal identifying a set of adaptive power amplifier back-off schemes available for use by the UE; and select the adaptive power amplifier back-off scheme from the set of adaptive power amplifier back-off schemes based at least in part on the identifier.

3. The UE of claim 2, wherein the set of adaptive power amplifier back-off schemes comprise the set of supported error vector magnitude levels, the set of supported output power levels, or both.

4. The UE of claim 1, wherein the one or more processors are individually or collectively further operable to execute the code to cause the UE to:

receive a grant scheduling the uplink transmission, the grant comprising an uplink transmission frequency resource allocation; and determine the identifier based at least in part on the uplink transmission frequency resource allocation.

5. The UE of claim 1, wherein the one or more processors are individually or collectively further operable to execute the code to cause the UE to:

receive a grant scheduling the uplink transmission, wherein the identifier is received in the grant.

6. The UE of claim 1, wherein the one or more processors are individually or collectively further operable to execute the code to cause the UE to:

receive, based at least in part on the identifier, an updated adaptive power amplifier back-off level, wherein the adaptive power amplifier back-off scheme is based at least in part on the updated adaptive power amplifier back-off level.

7. The UE of claim 6, wherein the updated adaptive power amplifier back-off level triggers an updated error vector magnitude level, an updated output power, or both.

8. The UE of claim 1, wherein the adaptive power amplifier back-off scheme is based on at least one of a cell load for a network entity the UE is communicating in, a UE-state associated with the UE, a UE-type of the UE, or any combination thereof.

9. The UE of claim 1, wherein to operate the power amplifier in the non-linear region includes use of a power supply voltage applied to the power amplifier based on the change to the error vector magnitude level.

10. The UE of claim 1, wherein to operate the power amplifier in the non-linear region includes increasing an output power level of the power amplifier based on the change to the output power.

11. A method for wireless communications at a user equipment (UE), comprising:

transmitting a capability message indicating support for adaptive power amplifier back-off for uplink transmissions, wherein the capability message indicates a set of supported error vector magnitude levels, a set of supported output power levels, or both, and wherein the support for adaptive power amplifier back-off is based at least in part on the set of supported error vector magnitude levels, the set of supported output power levels, or both;

receiving, based at least in part on the capability message, an identifier for an adaptive power amplifier back-off scheme to be applied to an uplink transmission; and performing the uplink transmission according to the adaptive power amplifier back-off scheme, wherein the adaptive power amplifier back-off scheme comprises a change to at least one of an error vector magnitude level for a power amplifier of the UE or an output power of the power amplifier of the UE, wherein the change triggers the power amplifier to operate in a non-linear region such that the uplink transmission includes a non-linear component.

12. The method of claim 11, further comprising:

receiving a control signal identifying a set of adaptive power amplifier back-off schemes available for use by the UE; and selecting the adaptive power amplifier back-off scheme from the set of adaptive power amplifier back-off schemes based at least in part on the identifier.

13. The method of claim 12, wherein the set of adaptive power amplifier back-off schemes comprise the set of supported error vector magnitude levels, the set of supported output power levels, or both.

14. The method of claim 11, further comprising:

receiving a grant scheduling the uplink transmission, the grant comprising an uplink transmission frequency resource allocation; and determining the identifier based at least in part on the uplink transmission frequency resource allocation.

15. The method of claim 11, further comprising:

receiving a grant scheduling the uplink transmission, wherein the identifier is received in the grant.

16. The method of claim 11, further comprising:

receiving, based at least in part on the identifier, an updated adaptive power amplifier back-off level, wherein the adaptive power amplifier back-off scheme is based at least in part on the updated adaptive power amplifier back-off level.

17. The method of claim 16, wherein the updated adaptive power amplifier back-off level triggers an updated error vector magnitude level, an updated output power, or both.

18. The method of claim 11, wherein the adaptive power amplifier back-off scheme is based on at least one of a cell load for a network entity the UE is communicating in, a UE-state associated with the UE, a UE-type of the UE, or any combination thereof.

19. A non-transitory computer-readable medium storing code for wireless communication at a user equipment (UE), the code comprising instructions executable by one or more processors to cause the UE to:

transmit a capability message indicating support for adaptive power amplifier back-off for uplink transmissions, wherein the capability message indicates a set of supported error vector magnitude levels, a set of supported output power levels, or both, and wherein the support for adaptive power amplifier back-off is based at least in part on the set of supported error vector magnitude levels, the set of supported output power levels, or both;

receive, based at least in part on the capability message, an identifier for an adaptive power amplifier back-off scheme to be applied to an uplink transmission; and perform the uplink transmission according to the adaptive power amplifier back-off scheme, wherein the adaptive power amplifier back-off scheme comprises a change to at least one of an error vector magnitude level for a power amplifier of the UE or an output power of the power amplifier of the UE, wherein the change triggers the power amplifier to operate in a non-linear region such that the uplink transmission includes a non-linear component.

20. The non-transitory computer-readable medium of claim 19, wherein the instructions are further executable by the one or more processors to cause the UE to:

receive a control signal identifying a set of adaptive power amplifier back-off schemes available for use by the UE; and select the adaptive power amplifier back-off scheme from the set of adaptive power amplifier back-off schemes based at least in part on the identifier.

21. The non-transitory computer-readable medium of claim 20, wherein the set of adaptive power amplifier back-off schemes comprise the set of supported error vector magnitude levels, the set of supported output power levels, or both.

22. The non-transitory computer-readable medium of claim 19, wherein the instructions are further executable by the one or more processors to cause the UE to:

receive a grant scheduling the uplink transmission, the grant comprising an uplink transmission frequency resource allocation; and determine the identifier based at least in part on the uplink transmission frequency resource allocation.

23. The non-transitory computer-readable medium of claim 19, wherein the instructions are further executable by the one or more processors to cause the UE to:

receive a grant scheduling the uplink transmission, wherein the identifier is received in the grant.

24. The non-transitory computer-readable medium of claim 19, wherein the instructions are further executable by the one or more processors to cause the UE to:

receive, based at least in part on the identifier, an updated adaptive power amplifier back-off level, wherein the adaptive power amplifier back-off scheme is based at least in part on the updated adaptive power amplifier back-off level.

25. The non-transitory computer-readable medium of claim 24, wherein the updated adaptive power amplifier back-off level triggers an updated error vector magnitude level, an updated output power, or both.

26. The non-transitory computer-readable medium of claim 19, wherein the adaptive power amplifier back-off scheme is based on at least one of a cell load for a network entity the UE is communicating in, a UE-state associated with the UE, a UE-type of the UE, or any combination thereof.

27. A user equipment (UE), comprising:

means for transmitting a capability message indicating support for adaptive power amplifier back-off for uplink transmissions, wherein the capability message indicates a set of supported error vector magnitude levels, a set of supported output power levels, or both, and wherein the support for adaptive power amplifier back-off is based at least in part on the set of supported error vector magnitude levels, the set of supported output power levels, or both;

means for receiving, based at least in part on the capability message, an identifier for an adaptive power amplifier back-off scheme to be applied to an uplink transmission; and means for performing the uplink transmission according to the adaptive power amplifier back-off scheme, wherein the adaptive power amplifier back-off scheme comprises a change to at least one of an error vector magnitude level for a power amplifier of the UE or an output power of the power amplifier of the UE, wherein the change triggers the power amplifier to operate in a non-linear region such that the uplink transmission includes a non-linear component.

* * * * *